US012482752B2

(12) United States Patent
Jain et al.

(10) Patent No.: US 12,482,752 B2
(45) Date of Patent: Nov. 25, 2025

(54) MEMORY CIRCUITRY AND METHOD USED IN FORMING MEMORY CIRCUITRY

(71) Applicant: Micron Technology, Inc., Boise, ID (US)

(72) Inventors: Harsh Narendrakumar Jain, Boise, ID (US); Yiping Wang, Boise, ID (US); Jordan Chess, Meridian, ID (US); Collin Howder, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 685 days.

(21) Appl. No.: 17/865,565

(22) Filed: Jul. 15, 2022

(65) Prior Publication Data
US 2023/0395513 A1    Dec. 7, 2023

Related U.S. Application Data

(60) Provisional application No. 63/347,695, filed on Jun. 1, 2022.

(51) Int. Cl.
*H01L 23/535* (2006.01)
*H01L 23/528* (2006.01)
*H10B 41/27* (2023.01)
*H10B 43/27* (2023.01)

(52) U.S. Cl.
CPC ........ *H01L 23/535* (2013.01); *H01L 23/5283* (2013.01); *H10B 41/27* (2023.02); *H10B 43/27* (2023.02)

(58) Field of Classification Search
CPC ... H01L 23/535; H01L 23/5283; H10B 41/27; H10B 43/27; H10B 41/50; H10B 43/50
See application file for complete search history.

(56) References Cited

U.S. PATENT DOCUMENTS 10,153,296 B2 *  12/2018  Iida .................. H10B 43/10
2022/0028888 A1 *  1/2022  Zhang ................ H10B 43/50

* cited by examiner

*Primary Examiner* — Zandra V Smith
*Assistant Examiner* — Corbyn D Mellinger
(74) *Attorney, Agent, or Firm* — Wells St. John P.S.

(57) ABSTRACT

A method used in forming memory circuitry comprises forming a stack comprising vertically-alternating first tiers and second tiers, with the stack extending from a memory-array region into a stair-step region. The stair-step region comprises a flight of stairs in a first vertical cross-section along a first direction. Masking material is formed directly above the flight of stairs. A species is ion implanted into the masking material to form different-composition first and second regions that are directly above individual of the stairs along a second direction that is orthogonal to the first direction. One of the first and the second regions is removed selectively relative to the other of the first and the second regions. After the removing, the other of the first and second regions is used as a mask while etching through one of the first tiers and one of the second tiers in the individual stairs to form multiple different-depth treads in the individual stairs in a second vertical cross-section along the second direction. Other embodiments, including structure, are disclosed.

20 Claims, 41 Drawing Sheets

FIG. 5

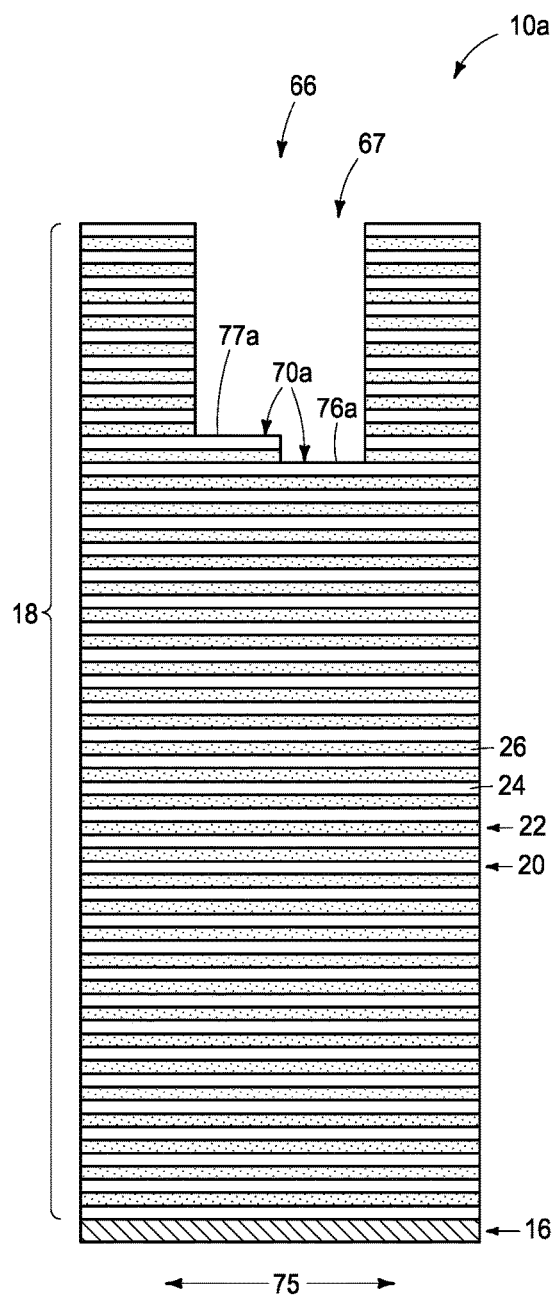
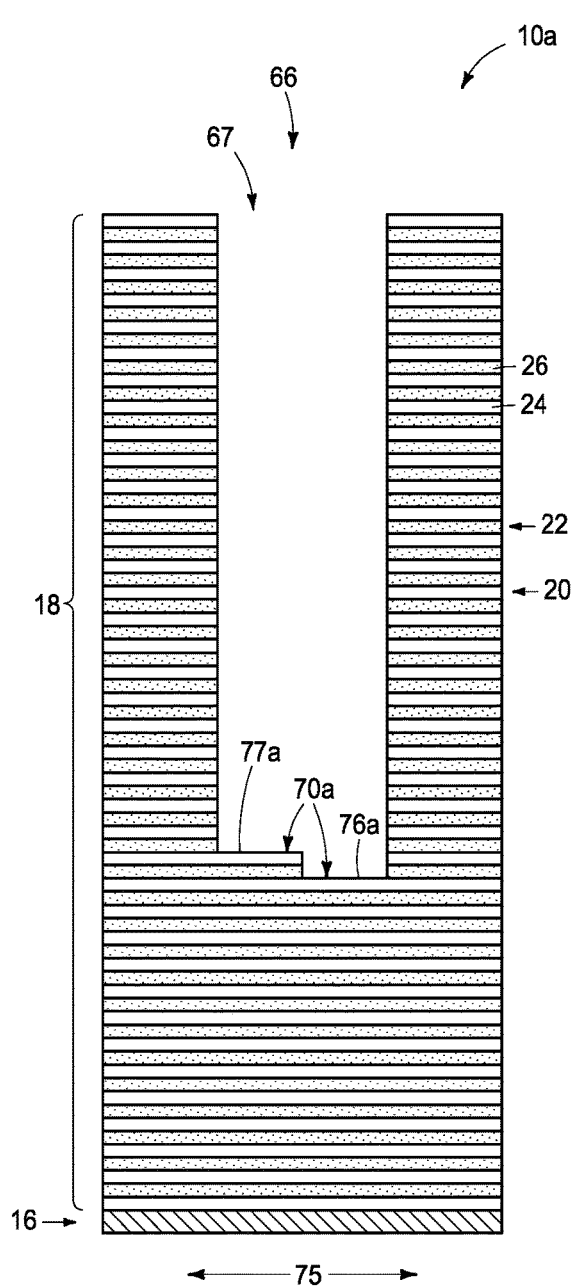
FIG. 34
FIG. 35

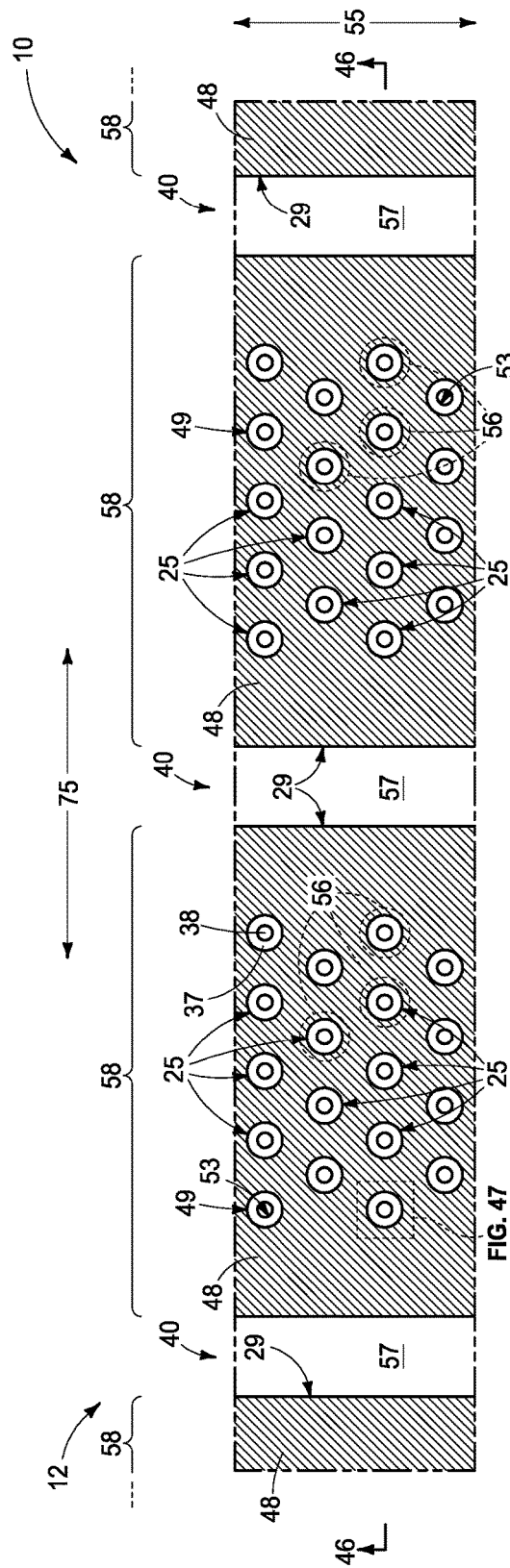
FIG. 45
FIG. 47
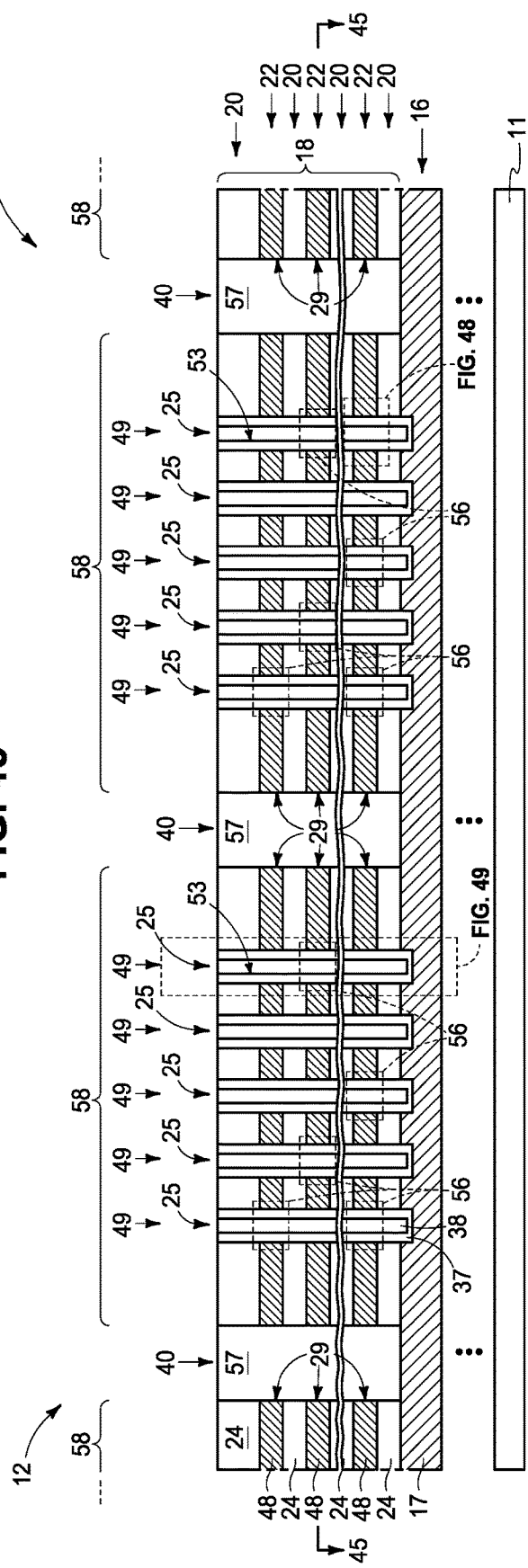
FIG. 46

MEMORY CIRCUITRY AND METHOD USED IN FORMING MEMORY CIRCUITRY

RELATED PATENT DATA

This application claims priority to U.S. Provisional Patent Application Ser. No. 63/347,695 filed Jun. 1, 2022, entitled "Memory Circuitry And Method Used In Forming Memory Circuitry", naming Harsh Narendrakumar Jain, Yiping Wang, Jordan Chess, and Collin Howder as inventors, the disclosure of which is incorporated by reference.

TECHNICAL FIELD

Embodiments disclosed herein pertain to memory circuitry and to methods used in forming memory circuitry.

BACKGROUND

Memory is one type of integrated circuitry and is used in computer systems for storing data. Memory may be fabricated in one or more arrays of individual memory cells. Memory cells may be written to, or read from, using digitlines (which may also be referred to as bitlines, data lines, or sense lines) and access lines (which may also be referred to as wordlines). The sense lines may conductively interconnect memory cells along columns of the array, and the access lines may conductively interconnect memory cells along rows of the array. Each memory cell may be uniquely addressed through the combination of a sense line and an access line.

Memory cells may be volatile, semi-volatile, or non-volatile. Non-volatile memory cells can store data for extended periods of time in the absence of power. Non-volatile memory is conventionally specified to be memory having a retention time of at least about 10 years. Volatile memory dissipates and is therefore refreshed/rewritten to maintain data storage. Volatile memory may have a retention time of milliseconds or less. Regardless, memory cells are configured to retain or store memory in at least two different selectable states. In a binary system, the states are considered as either a "0" or a "1". In other systems, at least some individual memory cells may be configured to store more than two levels or states of information.

A field effect transistor is one type of electronic component that may be used in a memory cell. These transistors comprise a pair of conductive source/drain regions having a semiconductive channel region there-between. A conductive gate is adjacent the channel region and separated there-from by a thin gate insulator. Application of a suitable voltage to the gate allows current to flow from one of the source/drain regions to the other through the channel region. When the voltage is removed from the gate, current is largely prevented from flowing through the channel region. Field effect transistors may also include additional structure, for example a reversibly programmable charge-storage region as part of the gate construction between the gate insulator and the conductive gate.

Flash memory is one type of memory and has numerous uses in modern computers and devices. For instance, modern personal computers may have BIOS stored on a flash memory chip. As another example, it is becoming increasingly common for computers and other devices to utilize flash memory in solid state drives to replace conventional hard drives. As yet another example, flash memory is popular in wireless electronic devices because it enables manufacturers to support new communication protocols as they become standardized, and to provide the ability to remotely upgrade the devices for enhanced features.

NAND may be a basic architecture of integrated flash memory. A NAND cell unit comprises at least one selecting device coupled in series to a serial combination of memory cells (with the serial combination commonly being referred to as a NAND string). NAND architecture may be configured in a three-dimensional arrangement comprising vertically-stacked memory cells individually comprising a reversibly programmable vertical transistor. Control or other circuitry may be formed below the vertically-stacked memory cells. Other volatile or non-volatile memory array architectures may also comprise vertically-stacked memory cells that individually comprise a transistor.

Memory arrays may be arranged in memory pages, memory blocks and partial blocks (e.g., sub-blocks), and memory planes, for example as shown and described in any of U.S. Patent Application Publication Nos. 2015/0228651, 2016/0267984, and 2017/0140833. The memory blocks may at least in part define longitudinal outlines of individual wordlines in individual wordline tiers of vertically-stacked memory cells. Connections to these wordlines may occur in a so-called "stair-step structure" at an end or edge of an array of the vertically-stacked memory cells. The stair-step structure includes individual "stairs" (alternately termed "steps" or "stair-steps") that define contact regions of the individual wordlines upon which elevationally-extending conductive vias contact to provide electrical access to the wordlines.

DETAILED DESCRIPTION OF EXAMPLE EMBODIMENTS

Figure 1:
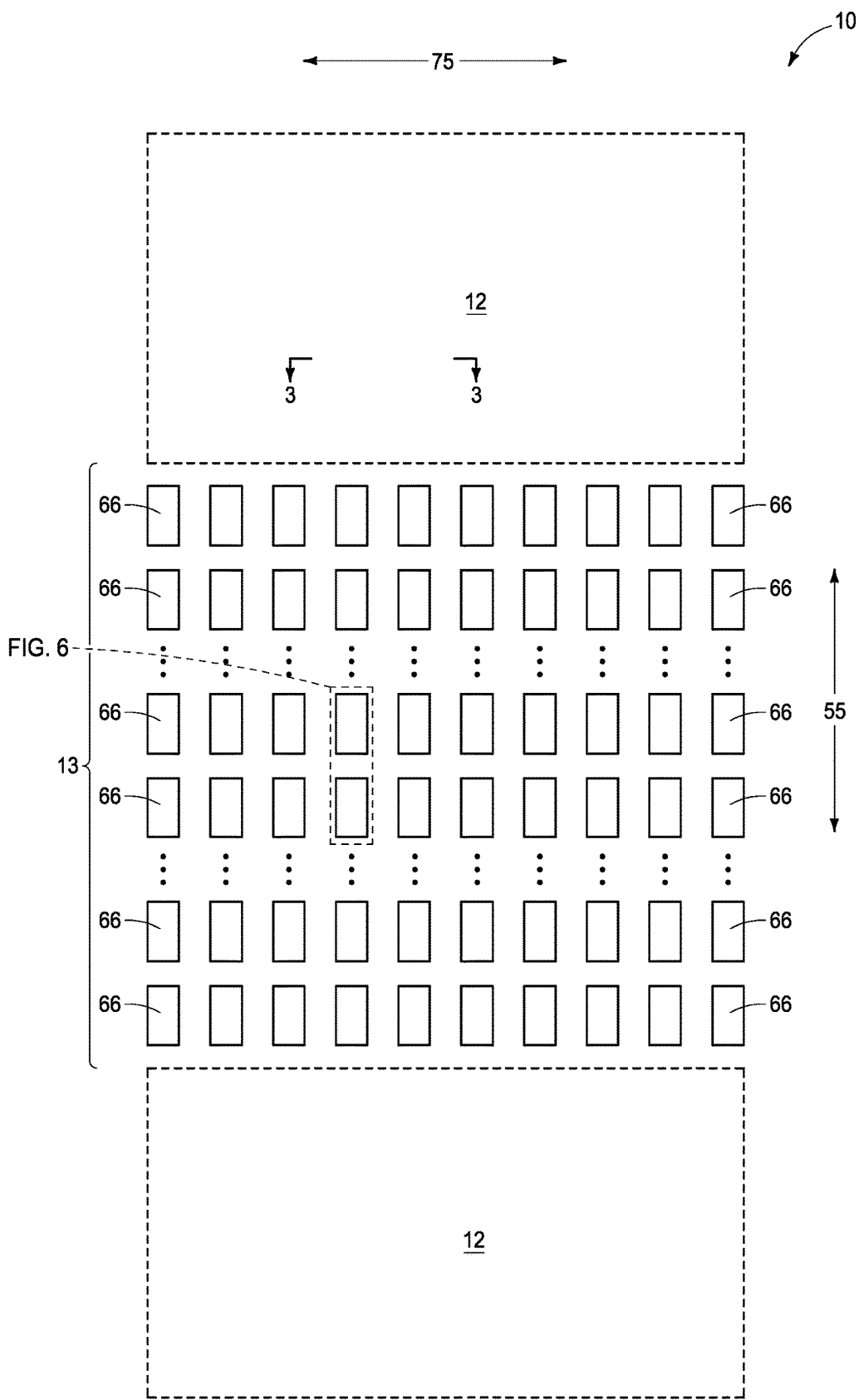
FIG. 1 is a diagrammatic view of a portion of memory circuitry in process in accordance with embodiments of the invention.
Figure 2:
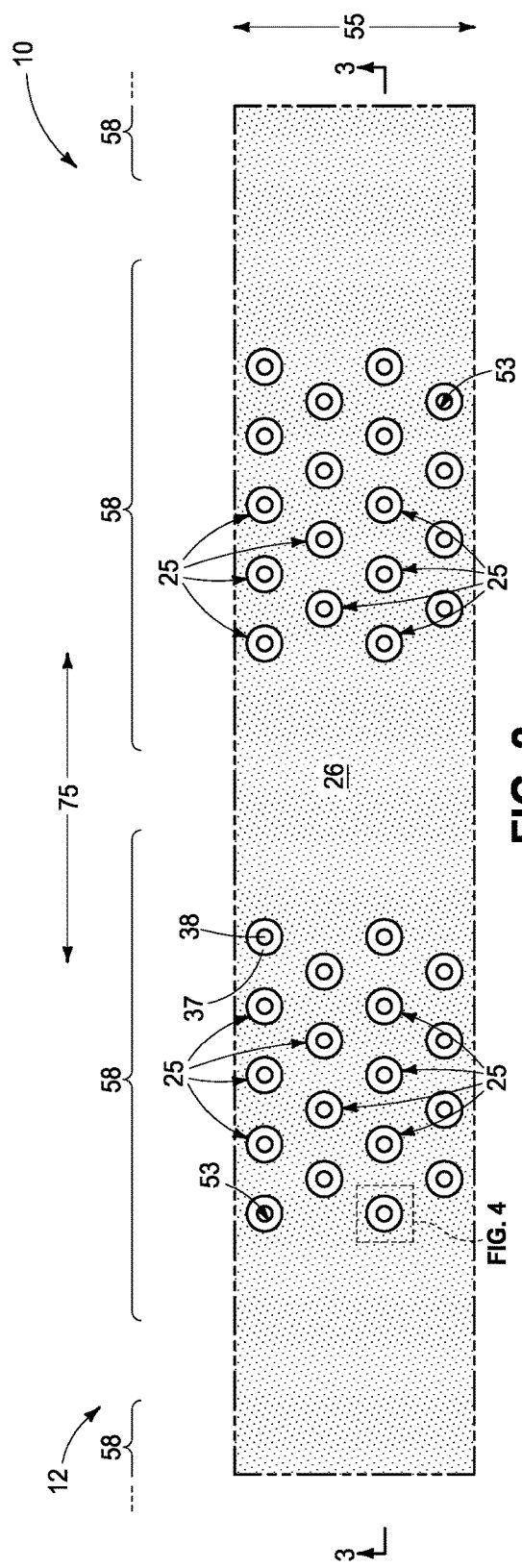
FIGS. 2 and 4-60 are diagrammatic sectional, expanded, enlarged, and/or partial views of the construction of FIGS. 1 and 2 or portions thereof.
Figure 3:
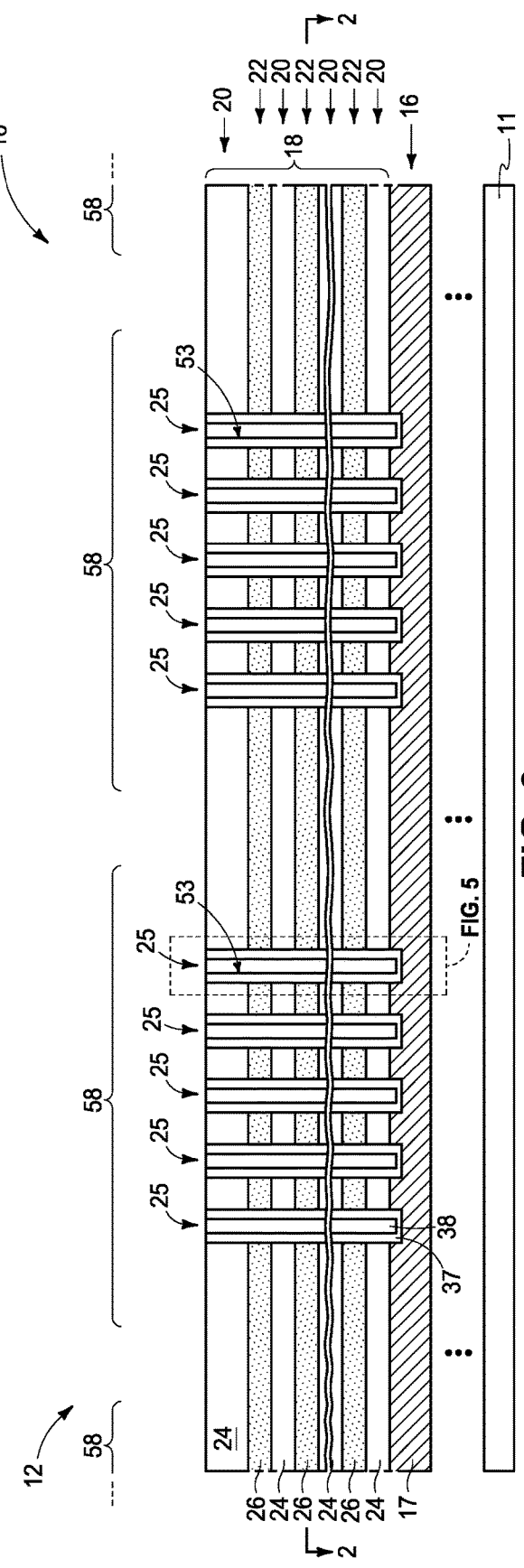
FIG. 3 is a diagrammatic cross-sectional view taken through line 3-3 in FIG. 1.
Figure 4:
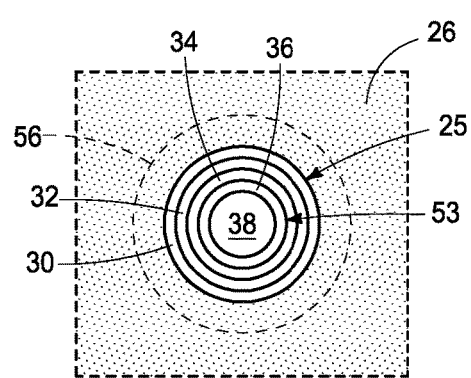
Figure 5:
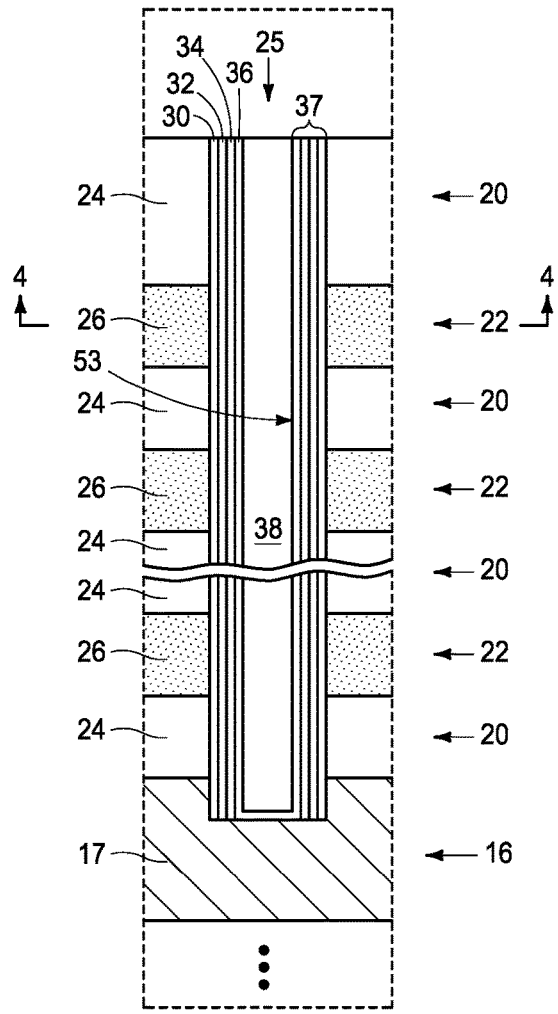
Figure 60:
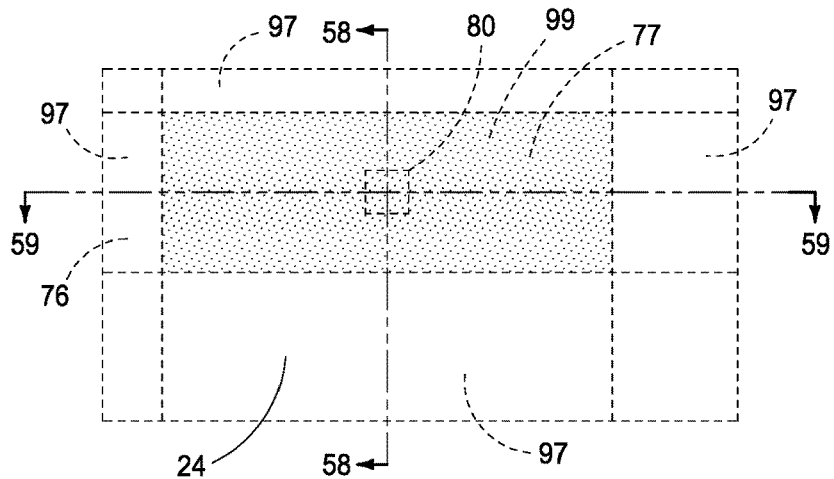

Embodiments of the invention encompass methods used in forming a memory array, for example an array of NAND or other memory cells that may have at least some peripheral control circuitry under the array (e.g., CMOS-under-array). Embodiments of the invention encompass so-called "gate-last" or "replacement-gate" processing, so-called "gate-first" processing, and other processing whether existing or future-developed independent of when transistor gates are formed. Embodiments of the invention also encompass integrated circuitry comprising a memory array comprising strings of memory cells (e.g., NAND architecture) independent of method of manufacture. Some example embodiments are described with reference to FIGS. 1-60.

FIGS. 1-9 show an example construction 10 having two memory-array regions 12 in which elevationally-extending strings of transistors and/or memory cells will be formed. The two memory-array regions 12 may be of the same or different constructions relative one another. In one embodiment, a stair-step region 13 is between memory-array regions 12 and comprises stair-step structures as described below. Alternately, by way of example, a stair-step region may be at the end of a single memory-array region (not shown). FIGS. 6-9 are of different and varying scales compared to FIGS. 1-5 for clarity in disclosure more pertinent to stair-step region 13 than to memory-array regions 12. Example construction 10 comprises a base substrate 11 having any one or more of conductive/conductor/conducting, semiconductive/semiconductor/semiconducting, or insulative/insulator/insulating (i.e., electrically herein) materials. Various materials have been formed elevationally over base substrate 11. Materials may be aside, elevationally inward, or elevationally outward of the FIGS. 1-9-depicted materials. For example, other partially or wholly fabricated components of integrated circuitry may be provided somewhere above, about, or within base substrate 11. Control and/or other peripheral circuitry for operating components within an array (e.g., individual array regions 12) of elevationally-extending strings of memory cells may also be fabricated and may or may not be wholly or partially within an array or sub-array. Further, multiple sub-arrays may also be fabricated and operated independently, in tandem, or otherwise relative one another. In this document, a "sub-array" may also be considered as an array.

A conductor tier 16 comprising conductor material 17 (e.g., WSi$_x$ under conductively-doped polysilicon) is above substrate 11. Conductor tier 16 may comprise part of control circuitry (e.g., peripheral-under-array circuitry and/or a common source line or plate) used to control read and write access to the transistors and/or memory cells in array 12. A vertical stack 18 comprising vertically-alternating insulative tiers 20 and conductive tiers 22 is directly above conductor tier 16. In some embodiments, conductive tiers 22 may be referred to as first tiers 22 and insulative tiers 20 may be referred to as second tiers 20. Example thickness for each of tiers 20 and 22 is 20 to 60 nanometers. The example uppermost tier 20 may be thicker/thickest compared to one or more other tiers 20 and/or 22. Example first tiers 22 comprise material 26 (e.g., silicon nitride) and example second tiers 20 comprise material 24 (e.g., silicon dioxide). Only a small number of tiers 20 and 22 is shown in FIGS. 2-5 and other figures, with more likely stack 18 comprising dozens, a hundred or more, etc. of tiers 20 and 22. Other circuitry that may or may not be part of peripheral and/or control circuitry may be between conductor tier 16 and stack 18. For example, multiple vertically-alternating tiers of conductive material and insulative material of such circuitry may be below a lowest of the conductive tiers 22 and/or above an uppermost of the conductive tiers 22. For example, one or more select gate tiers (not shown) may be between conductor tier 16 and the lowest conductive tier 22 and one or more select gate tiers may be above an uppermost of conductive tiers 22 (not shown). Alternately or additionally, at least one of the depicted uppermost and lowest conductive tiers 22 may be a select gate tier.

Channel openings 25 have been formed (e.g., by etching) through insulative tiers 20 and conductive tiers 22 to conductor tier 16. Channel openings 25 may taper radially-inward and/or radially-outward (not shown) moving deeper in stack 18. In some embodiments, channel openings 25 may go into conductor material 17 of conductor tier 16 as shown or may stop there-atop (not shown). Alternately, as an example, channel openings 25 may stop atop or within the lowest insulative tier 20. A reason for extending channel openings 25 at least to conductor material 17 of conductor tier 16 is to assure direct electrical coupling of channel material to conductor tier 16 without using alternative processing and structure to do so when such a connection is desired and/or to provide an anchoring effect to material that is within channel openings 25. Etch-stop material (not shown) may be within or atop conductor material 17 of conductor tier 16 to facilitate stopping of the etching of channel openings 25 relative to conductor tier 16 when such is desired. Such etch-stop material may be sacrificial or non-sacrificial. By way of example and for brevity only, channel openings 25 are shown as being arranged in groups or columns of staggered rows of four and five openings 25 per row and being arrayed in laterally-spaced memory-block regions 58 that will comprise laterally-spaced memory blocks 58 in a finished circuitry construction. In this document, "block" is generic to include "sub-block". Memory-block regions 58 and resultant memory blocks 58 (not yet shown) may be considered as being longitudinally elongated and oriented, for example along a first direction 55, with a second direction 75 being orthogonal thereto. Any alternate existing or future-developed arrangement and construction may be used.

Transistor channel material may be formed in the individual channel openings elevationally along the insulative tiers and the conductive tiers, thus comprising individual channel-material strings, which is directly electrically coupled with conductive material in the conductor tier. Individual memory cells of the example memory array being formed may comprise a gate region (e.g., a control-gate region) and a memory structure laterally between the gate region and the channel material. In one such embodiment, the memory structure is formed to comprise a charge-blocking region, storage material (e.g., charge-storage material), and an insulative charge-passage material. The storage material (e.g., floating gate material such as doped or undoped silicon or charge-trapping material such as silicon nitride, metal dots, etc.) of the individual memory cells is elevationally along individual of the charge-blocking regions. The insulative charge-passage material (e.g., a band gap-engineered structure having nitrogen-containing material [e.g., silicon nitride] sandwiched between two insulator oxides [e.g., silicon dioxide]) is laterally between the channel material and the storage material.

The figures show one embodiment wherein charge-blocking material 30, storage material 32, and charge-passage material 34 have been formed in individual channel openings 25 elevationally along insulative tiers 20 and conductive tiers 22. Transistor materials 30, 32, and 34 (e.g., memory-cell materials) may be formed by, for example, deposition of respective thin layers thereof over stack 18 and within individual channel openings 25 followed by planarizing such back at least to a top surface of stack 18 as shown.

Channel material 36 has also been formed in channel openings 25 elevationally along insulative tiers 20 and conductive tiers 22 and comprise individual channel-material strings 53 in one embodiment having memory-cell materials (e.g., 30, 32, and 34) there-along and with material 24 in insulative tiers 20 being horizontally-between immediately-adjacent channel-material strings 53. Materials 30, 32, 34, and 36 are collectively shown as and only designated as material 37 in some figures due to scale. Example channel materials 36 include appropriately-doped crystalline semiconductor material, such as one or more silicon, germanium, and so-called III/V semiconductor materials (e.g., GaAs, InP, GaP, and GaN). Example thickness for each of materials 30, 32, 34, and 36 is 25 to 100 Angstroms. Punch etching may be conducted as shown to remove materials 30, 32, and 34 from the bases of channel openings 25 to expose conductor tier 16 such that channel material 36 (channel-material string 53) is directly electrically coupled with conductor material 17 of conductor tier 16. Such punch etching may occur separately with respect to each of materials 30, 32, and 34 (as shown) or may occur collectively with respect to all after deposition of material 34 (not shown). Alternately, and by way of example only, no punch etching may be conducted and channel material 36 may be directly electrically coupled with conductor material 17 of conductor tier 16 by a separate conductive interconnect (not shown). Channel openings 25 are shown as comprising a radially-central solid dielectric material 38 (e.g., spin-on-dielectric, silicon dioxide, and/or silicon nitride). Alternately, and by way of example only, the radially-central portion within channel openings 25 may include void space(s) (not shown) and/or be devoid of solid material (not shown).

Stair-step region 13 comprises a flight (e.g., 67 or 69) of stairs (e.g., 70) in a first vertical cross-section (e.g., that of FIG. 6) along a first direction (e.g., 55, or a direction orthogonal to direction 55 [along a "direction orthogonal" not being shown]). In one embodiment and as shown, stair-step region 13 comprises stair-step structures 66 along a first direction 55 having a crest 81 between immediately-first-direction-adjacent stair-step structures 66. In one embodiment and as shown, example stair-step structures 66 individually comprise two opposing flights 67 and 69 of stairs 70 in the first vertical cross-section along first direction 55. Flights 67 and 69 may have the same of different number of stairs (four being shown, not including the bottom landing therebetween) for ease of depiction. When multiple flights are present, no flight need have the same number of stairs as another flight and more or fewer stairs may be in an individual flight. In one embodiment, two opposing flights 67, 69 of stairs 70 in individual stair-step structures 66 extend along different non-overlapping depths relative one another (that may or may not be of the same lengths relative one another). All of flights 67 and 69 of all stair-step structures 66 in stair-step region 13 may extend along different non-overlapping depths relative one another (that may be of the same or different vertical length[s] relative one another).

Figure 6:
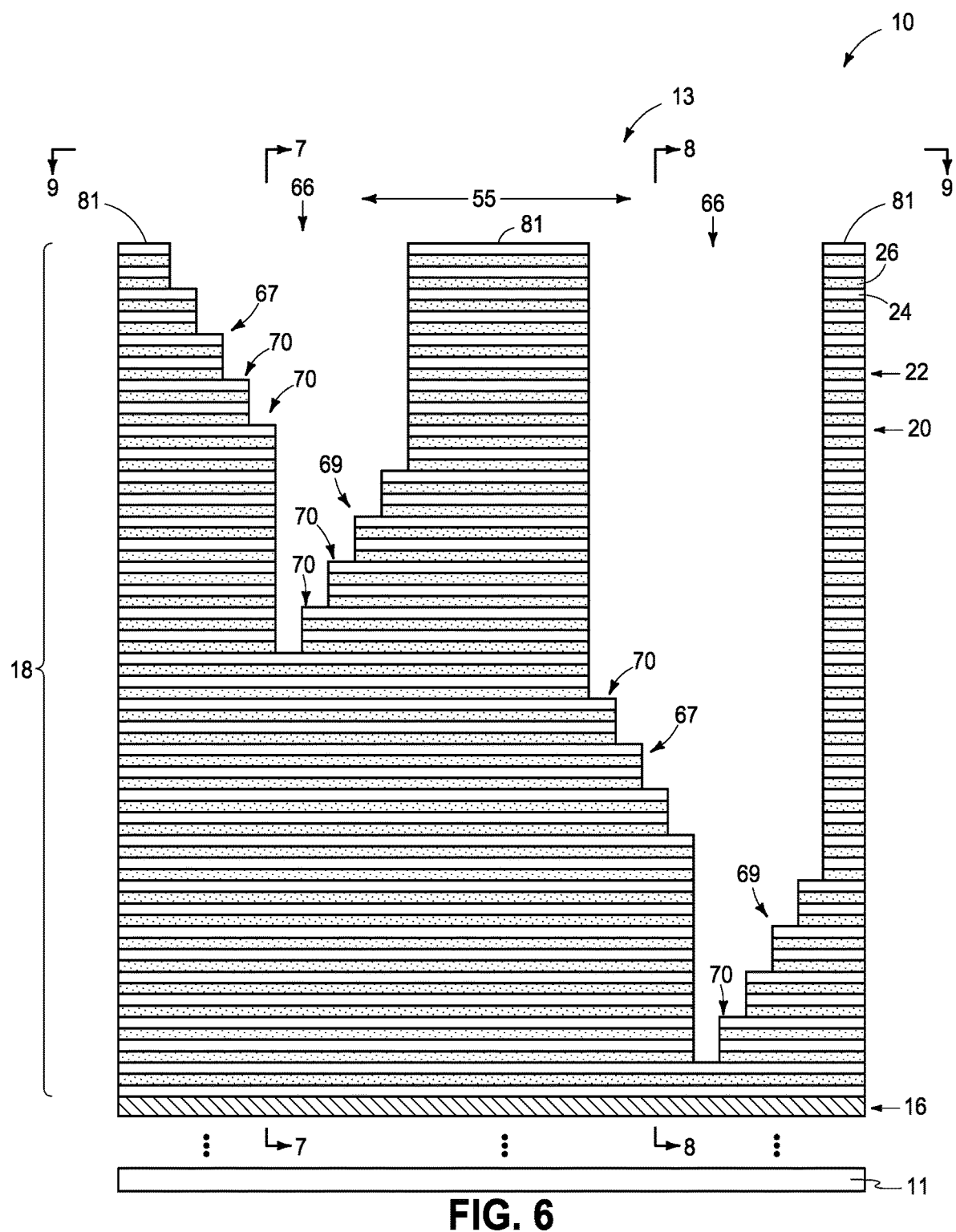
Figure 7:
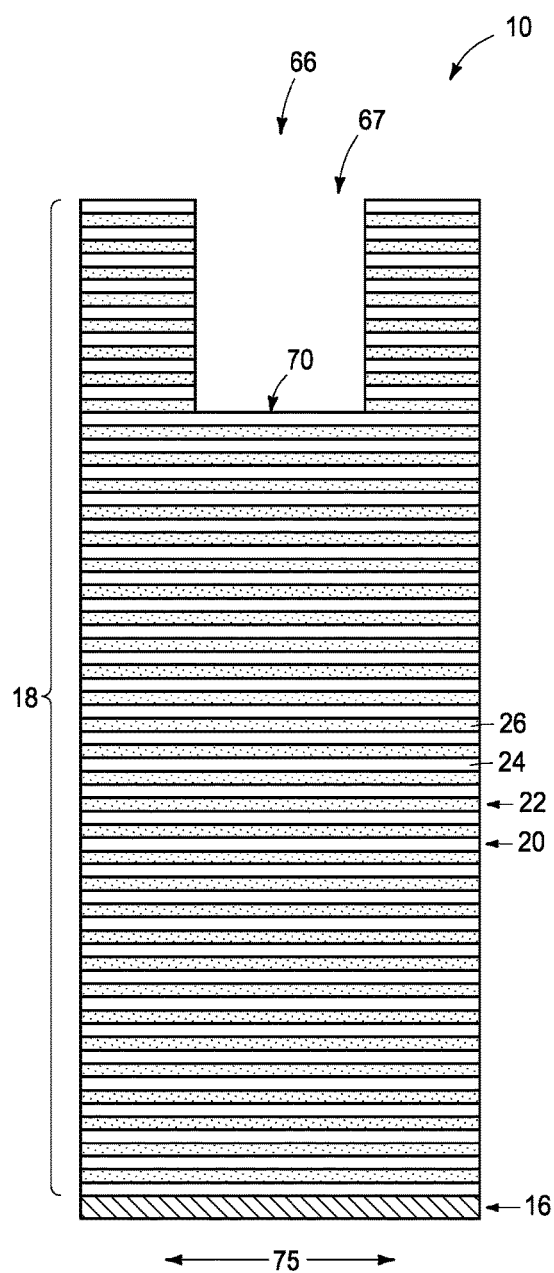
Figure 8:
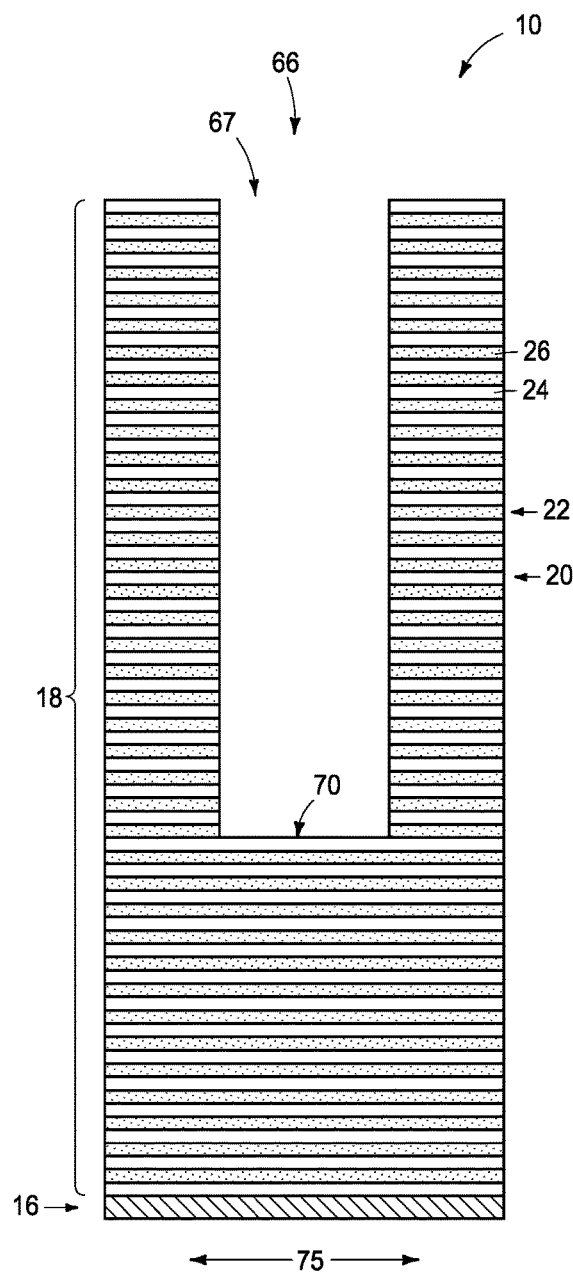
Figure 9:
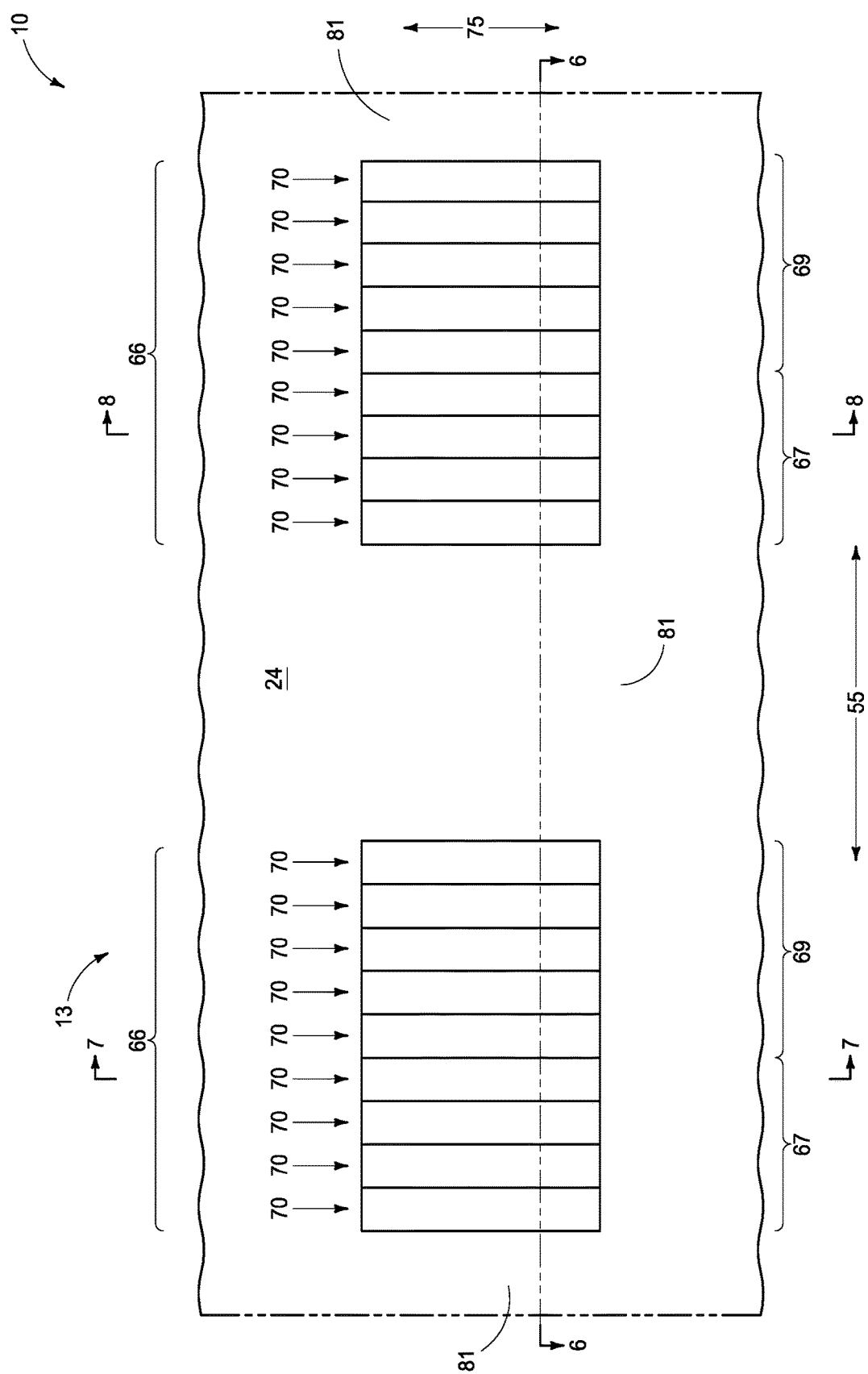
Figure 10:
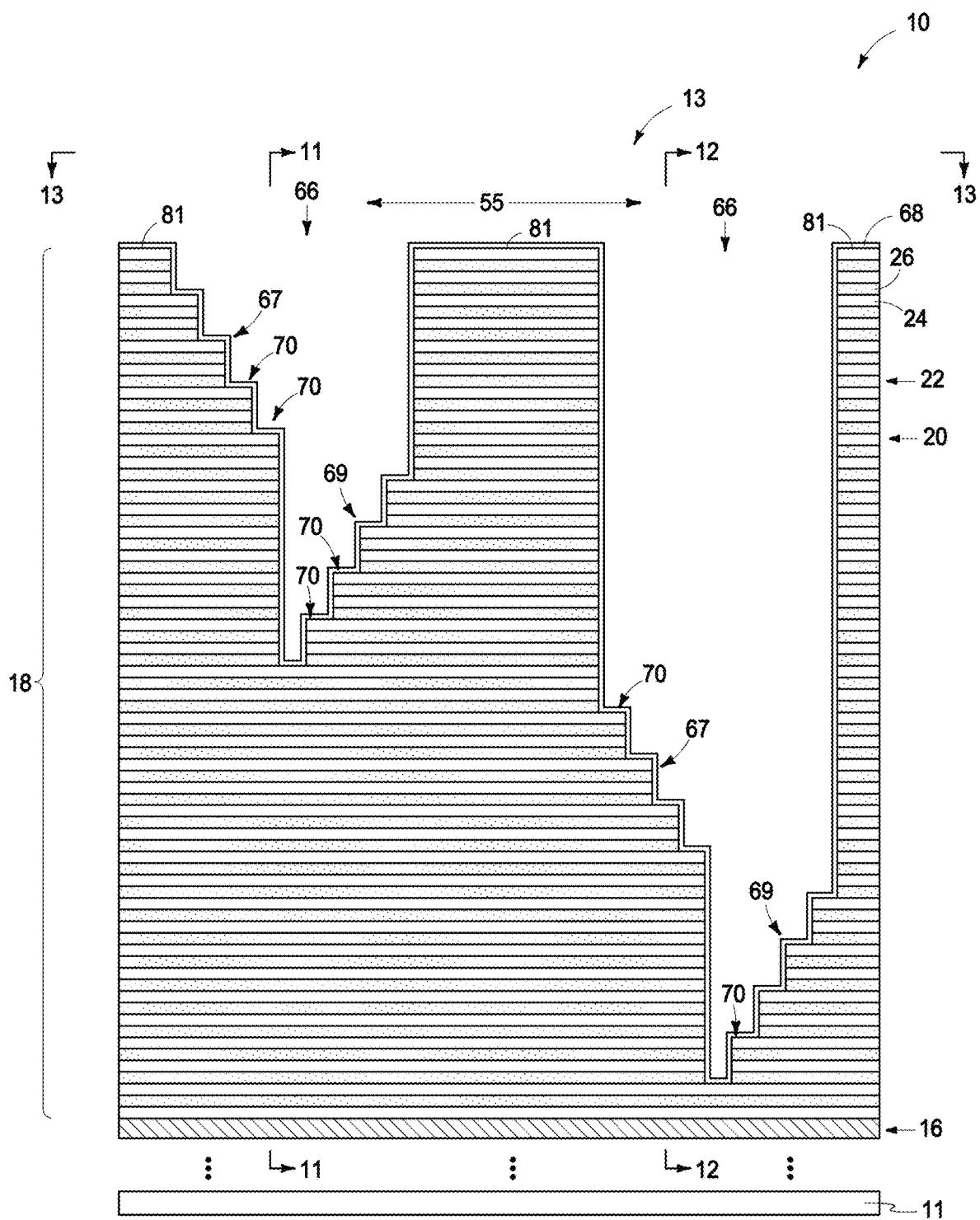
Figure 11:
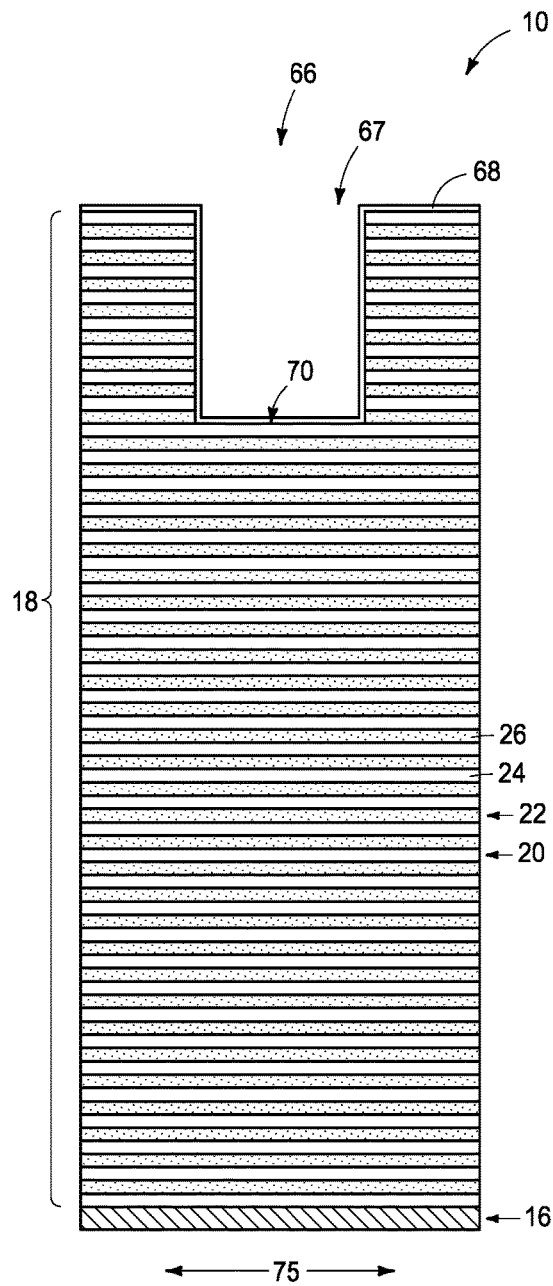
Figure 12:
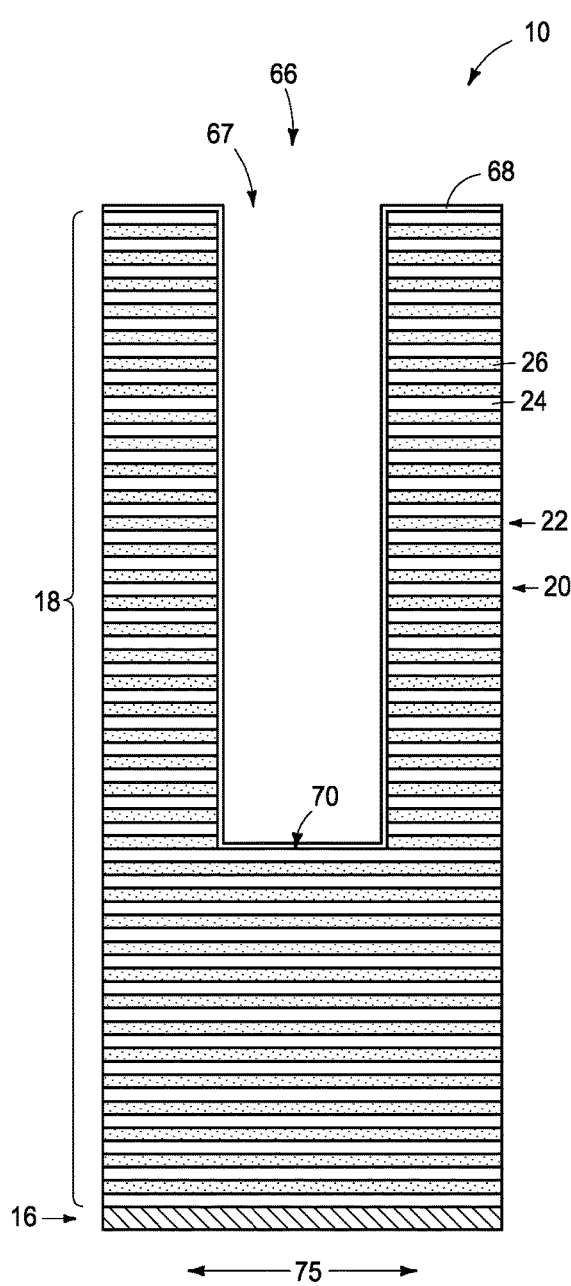
Figure 13:
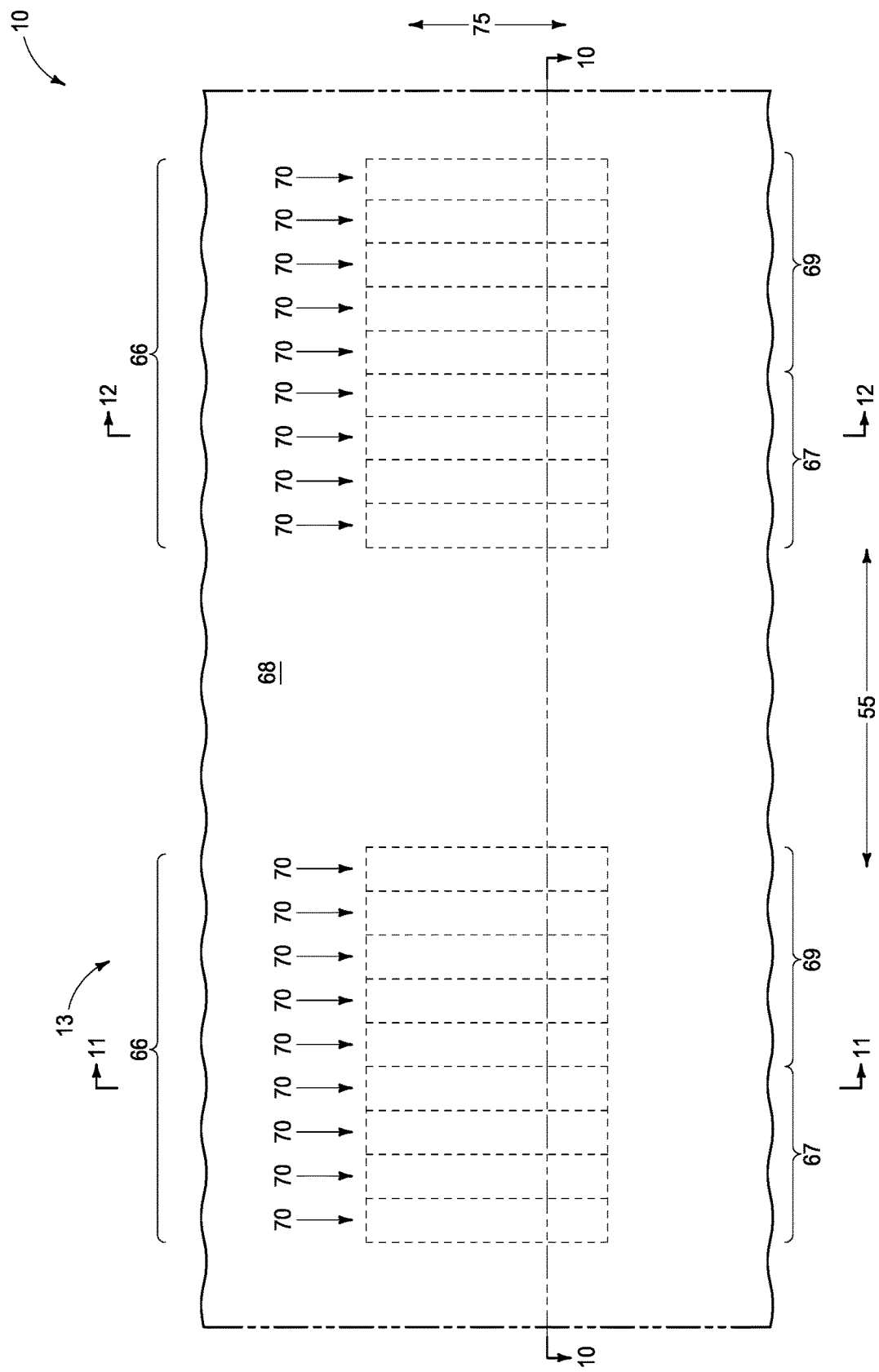
Figure 14:
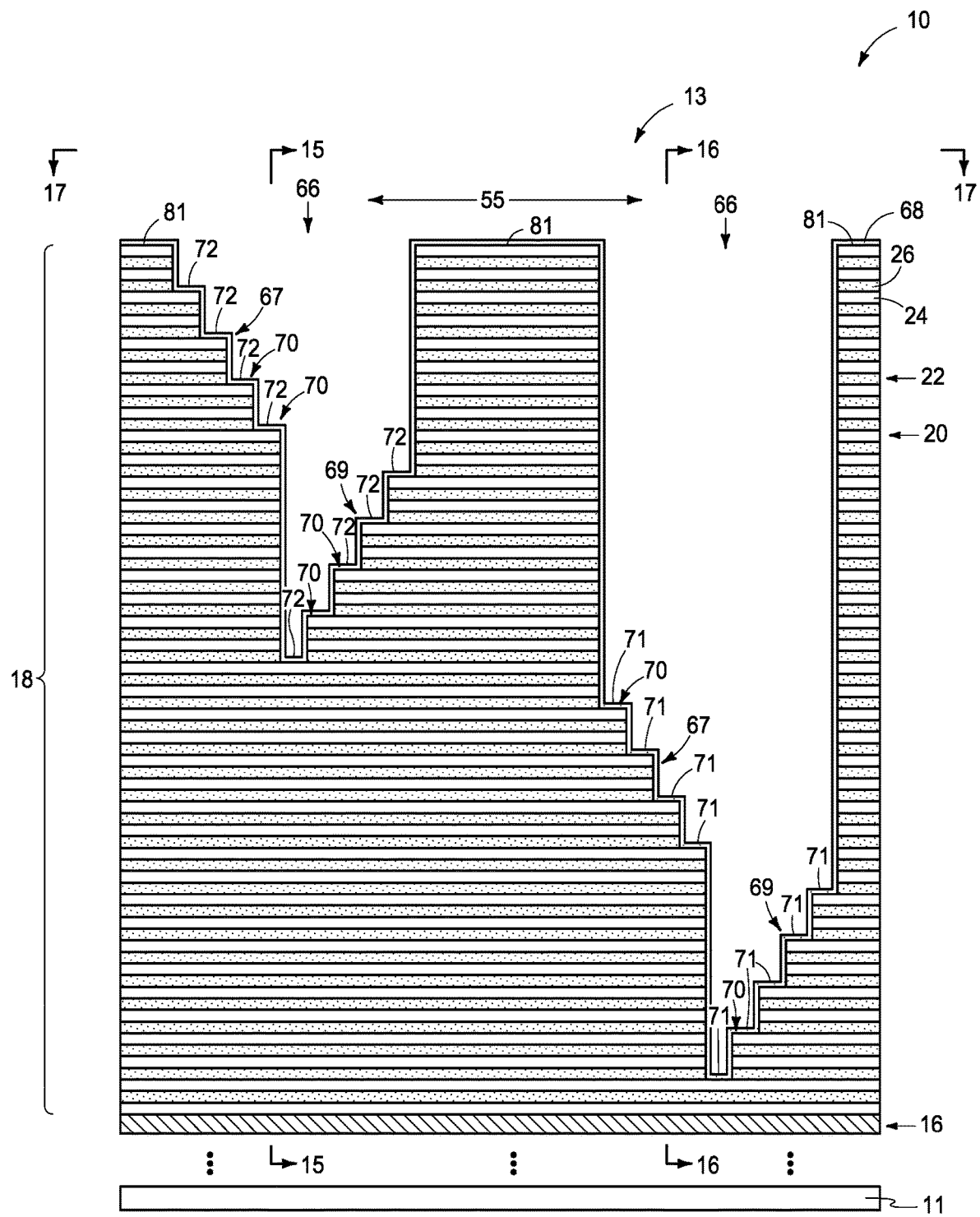
Figure 15:
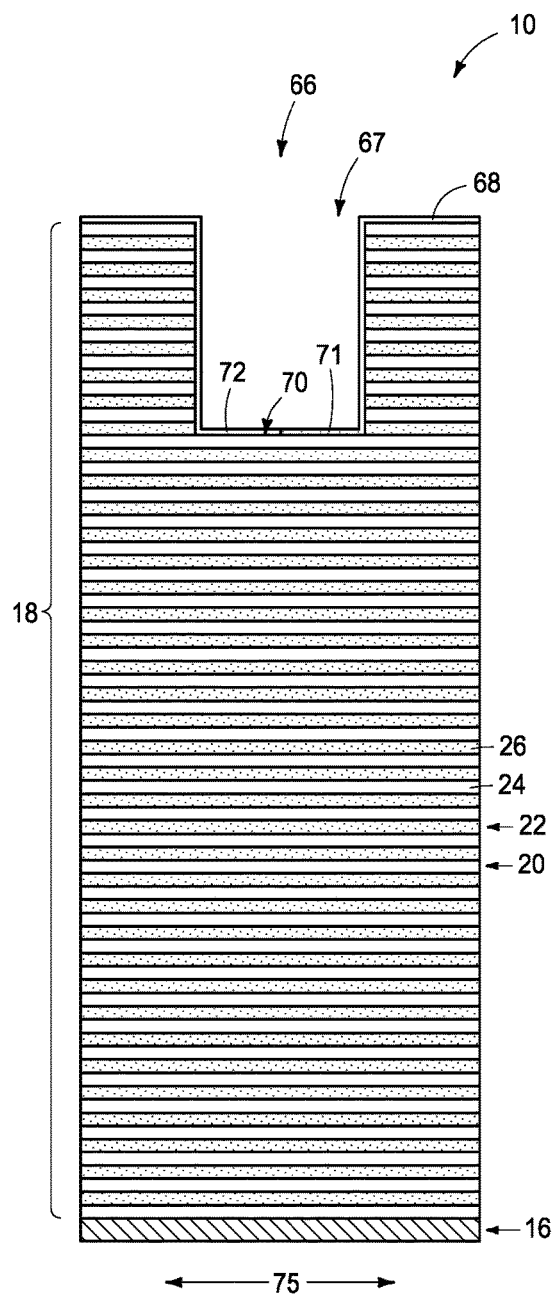
Figure 16:
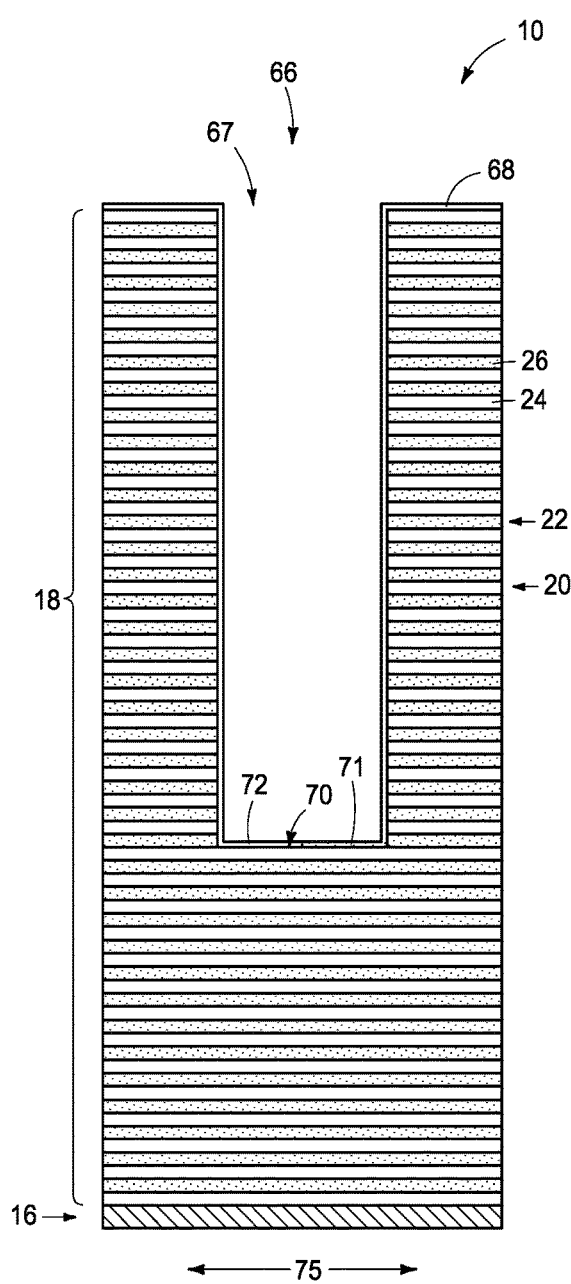
Figure 17:
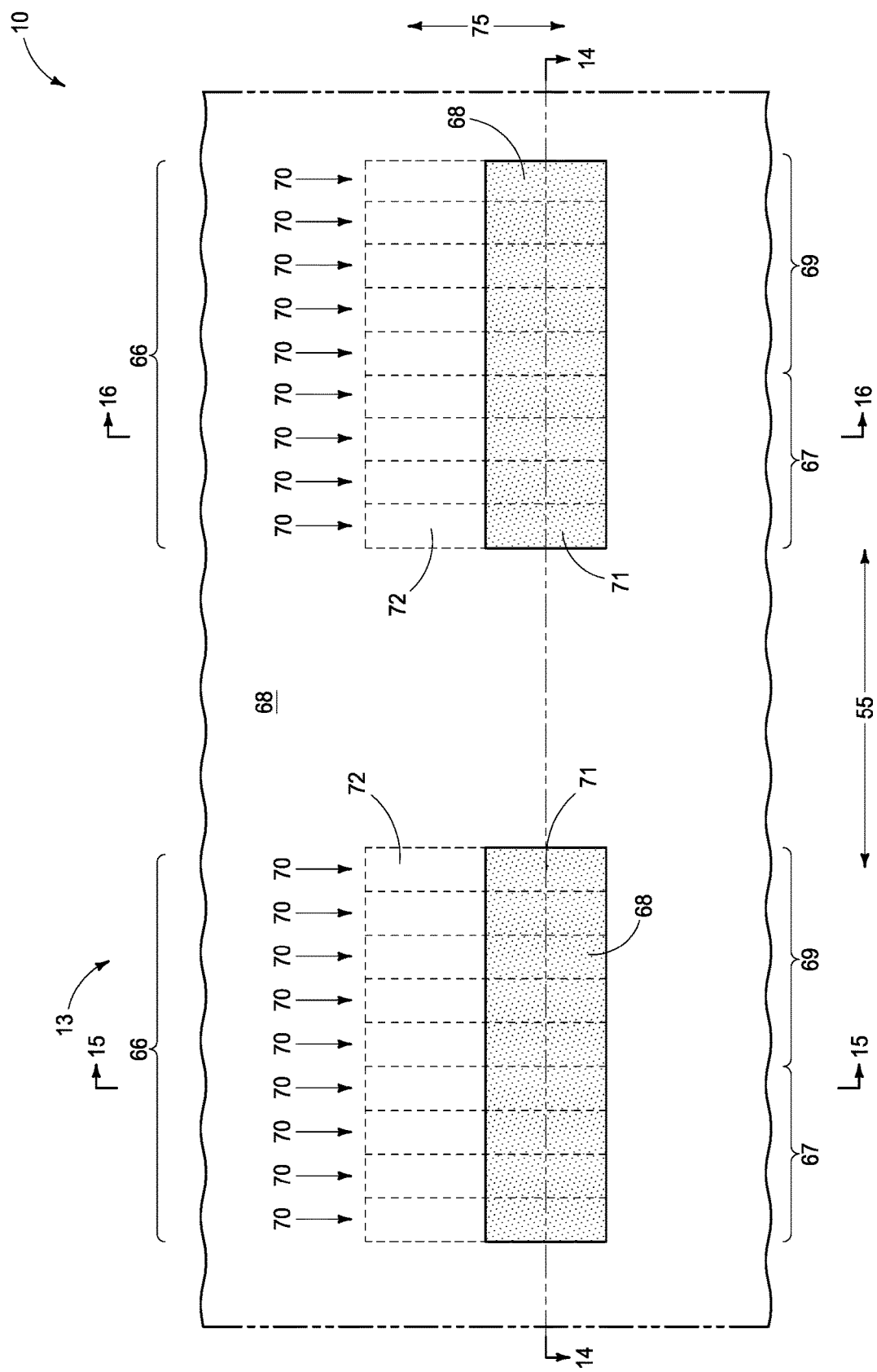
Figure 18:
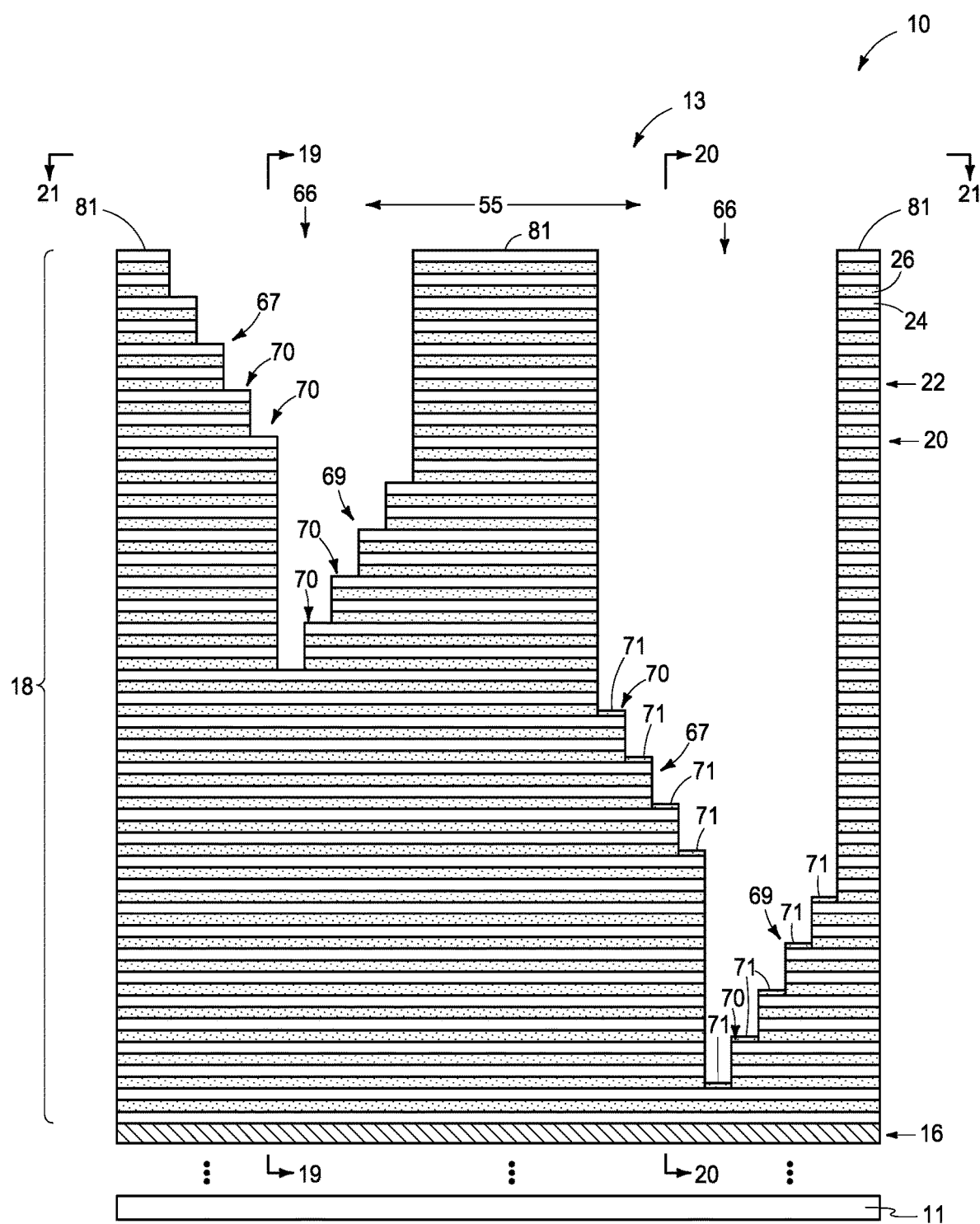
Figure 19:
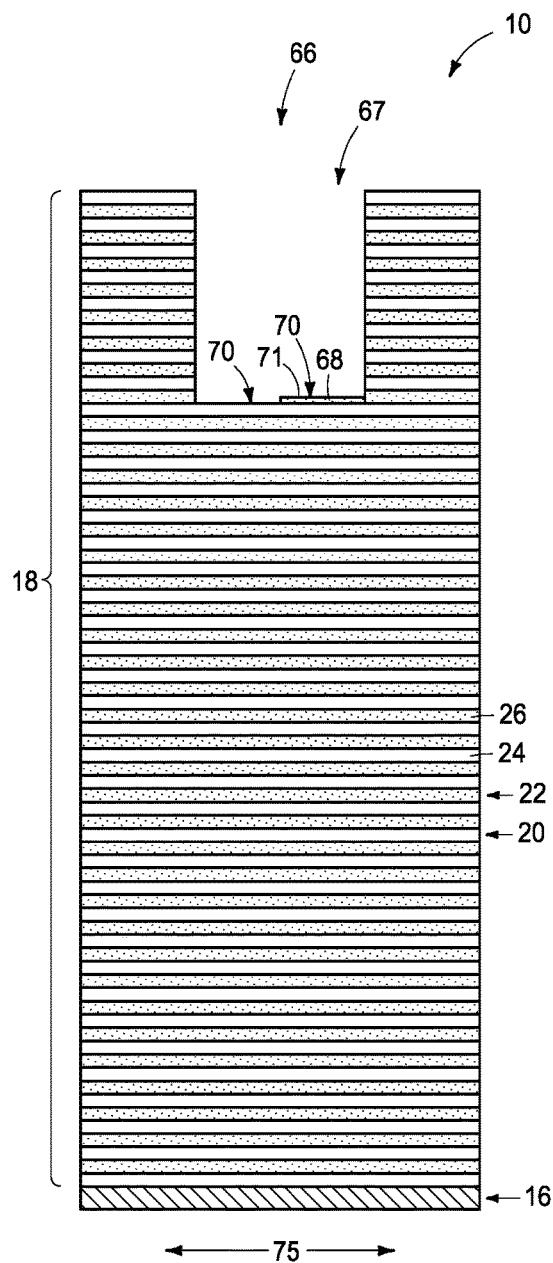
Figure 20:
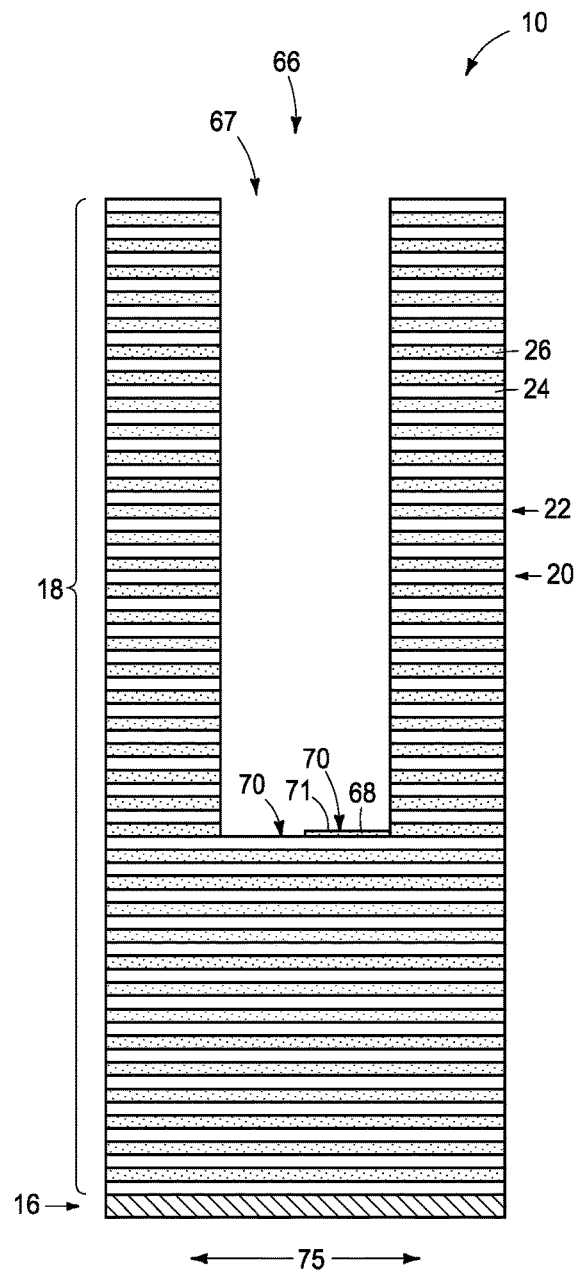
Figure 21:
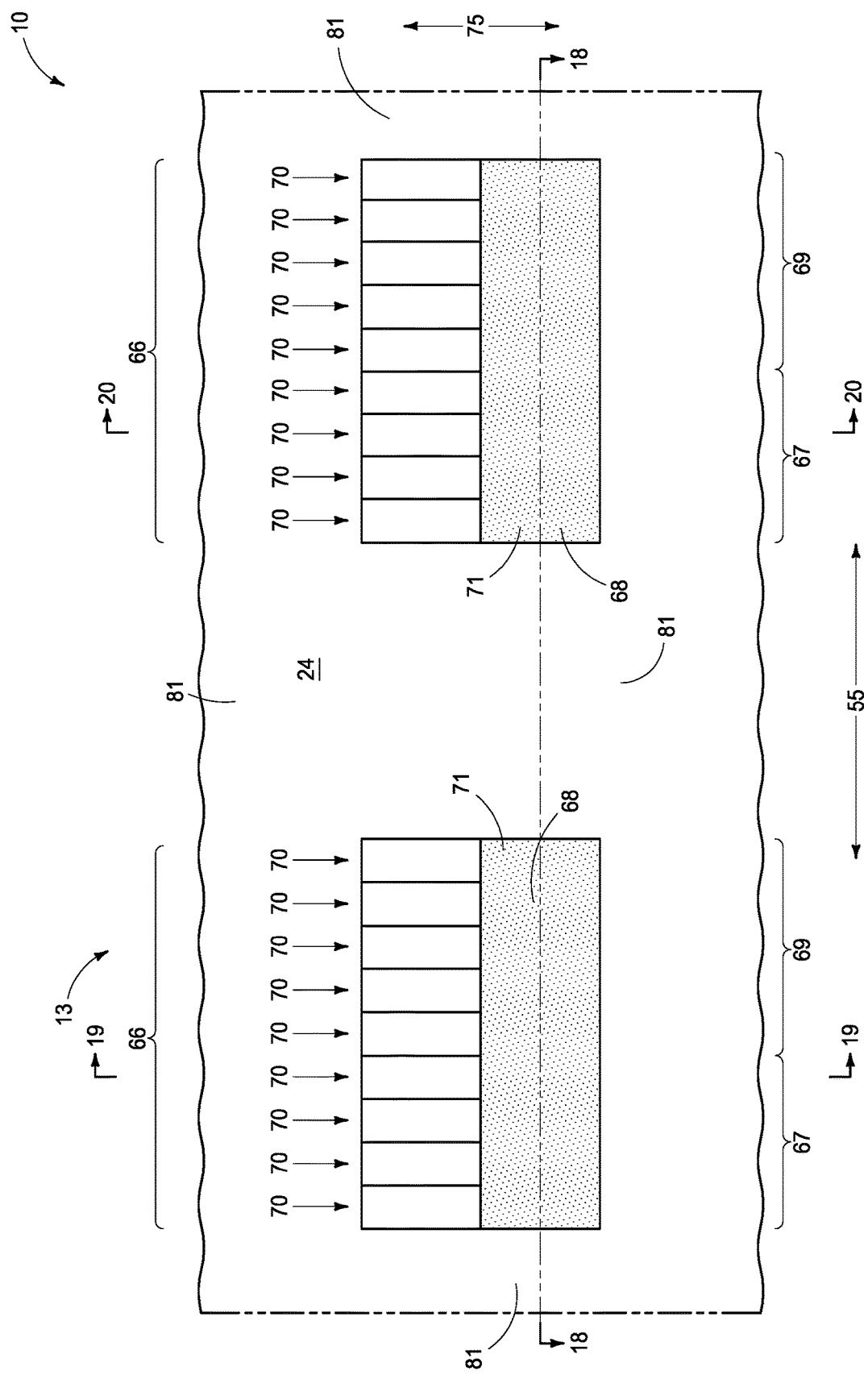

Stair-step structures 66 may be formed by any existing or later-developed method(s). As one such example, a masking material (e.g., a photo-imagable material such as photoresist) may be formed atop stack 18 and an opening formed there-through. Then, the masking material may be used as a mask while etching (e.g., anisotropically) through the opening to extend such opening into at least two upper tiers 20, 22. The resultant construction may then be subjected to a successive alternating series of lateral-trimming etches of the masking material followed by etching deeper into stack 18, multiple tier-pairs 20, 22 at a time, using the trimmed masking material having a successively widened opening as a mask. Such an example may result in the initial forming of opposing flights 67 and 69 that are elevationally coincident relative one another (not shown). Where desired, flights 67 and 69 in one or more stair-step structures 66 can together then be etched (translated) deeper into stack 18. Then or before, flight(s) 67 can then be masked while etching flight(s) 69 deeper in comparison to flight(s) 67. FIG. 6 shows an embodiment where each flight 67 and 69 has its individual stairs 70 as comprising two tiers 22 and two tiers 20 from which two different-depth (vertical depth) treads will be fabricated per individual stair 70 as will be apparent from the continuing discussion. Four, six, eight, etc. tiers 22 may be in an individual stair 70 for making more treads per stair than two. Regardless, all flights need not have individual stairs 70 that comprise multiple different-depth treads. Further, individual stairs 70 are shown as having their second tiers 20 directly above their first tiers 22 although such can be reversed (not shown). A bottom landing of a flight of stairs (e.g., that between flights 67 and 69) may be considered as being a stair 70. Pairs of opposing flights of stairs may be considered as defining a stadium (e.g., a vertically recessed portion having opposing flights of stairs). Alternately, only a single flight of stairs may in one or more stair-step structures 66 (not shown). Sidewalls of stair-step structures 66 are shown as being vertical, although such may taper laterally-inward and/or laterally-outward.

Referring to FIGS. 10-13, masking material 68 has been formed directly above (e.g., directly against) flight 67 and/or 69 of stairs 70. In some embodiments, masking material 68 comprises polysilicon or silicon nitride.

Referring to FIGS. 14-17, a species has been ion implanted into masking material 68 to form a first region 71 (at least one) and a second region 72 (at least one) that are directly above individual stairs 70 along a second direction (e.g., 75) that is orthogonal to the first direction (e.g., 55). Use of "first" and "second" with respect to regions 71 and 72 is just to distinguish one from the other and alternately in the depicted example the first may be considered as the second and the second as the first. The species may be implanted into either region, for example while the other is masked such that different composition regions (at least two per stair 70) are formed. FIGS. 14-17 show first region 71 as having been ion implanted with the species, for example while a mask (not shown) is directly above second region 72 during such ion implanting. Such a mask may be formed atop construction 10 to cover all of it, for example, but for first regions 71.

One of first region 71 and second region 72 is then removed selectively relative to the other of first region 71 and second region 72 atop individual stairs 70 (e.g., by etching). Referring to FIGS. 18-21, such show an example wherein second region 72 (not shown; and, in one embodiment, remaining portions of masking material 68 but for first regions 71) has been removed selectively relative to first region 71.

In one embodiment, the ion-implanted species is at least one element from IUPAC Groups 13, 14, 15, 16, 17, and 18 of the periodic table, in one such embodiment is present in the implanted region in the masking material at $1\times10^{16}$ to $1\times10^{22}$ atoms/cm$^3$, and in one such latter embodiment is present in the implanted region of the masking material at $1\times10^{18}$ to $5\times10^{21}$ atoms/cm$^3$. In one embodiment, the ion-implanted species is only one element from IUPAC Groups 13, 14, 15, 16, 17, and 18 of the periodic table and in another embodiment is more than one of such elements. As examples, it is expected that all but antimony, germanium, and argon as the predominant implanted element (e.g., to a concentration of at least at $1\times10^{16}$ atoms/cm$^3$) will reduce the etch-rate of the implanted region(s) of masking material 68 as compared to the as-deposited region(s) of masking material 68. Some ideal examples are carbon, boron, and nitrogen. As an example, polysilicon that has been suitably ion implanted with one or more elements from IUPAC Groups 13, 14, 15, 16, 17, and 18 as the predominant species will etch considerably slower in tetramethylammonium hydroxide than polysilicon that has not been so ion implanted. As another example, silicon nitride that has been suitably ion implanted with one or more elements from IUPAC Groups 13, 14, 15, 16, 17, and 18 as the predominant species will etch considerably slower in hot phosphoric acid than silicon nitride that has not been so ion implanted. Accordingly, by way of example, and in the depicted embodiment, first region 71 can be so implanted and then masking material 68 subjected to a timed etch to produce the construction of FIGS. 18-21. The thickness of first region 71 may be reduced in the process (not shown). The artisan is capable of selecting other as-deposited masking materials 68 and associated etching chemistries therefor to produce the example construction as shown in FIGS. 18-21.

Figure 22:
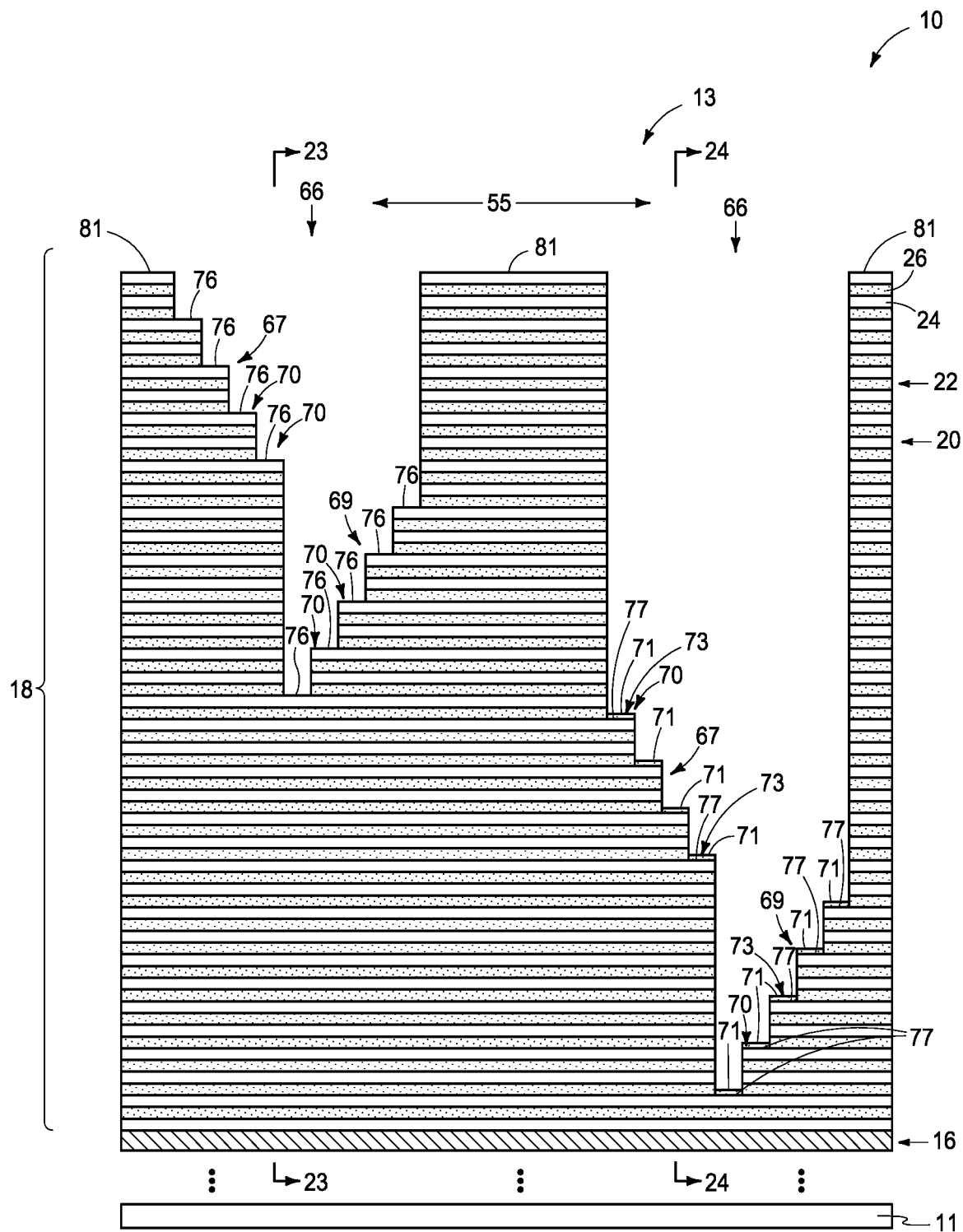
Figure 23:
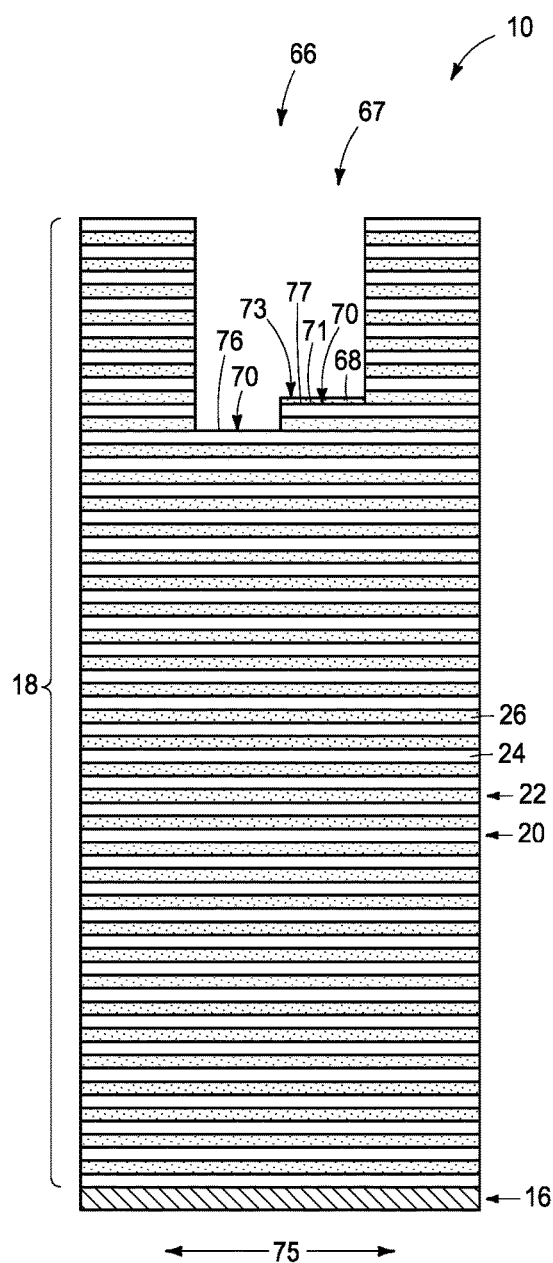
Figure 24:
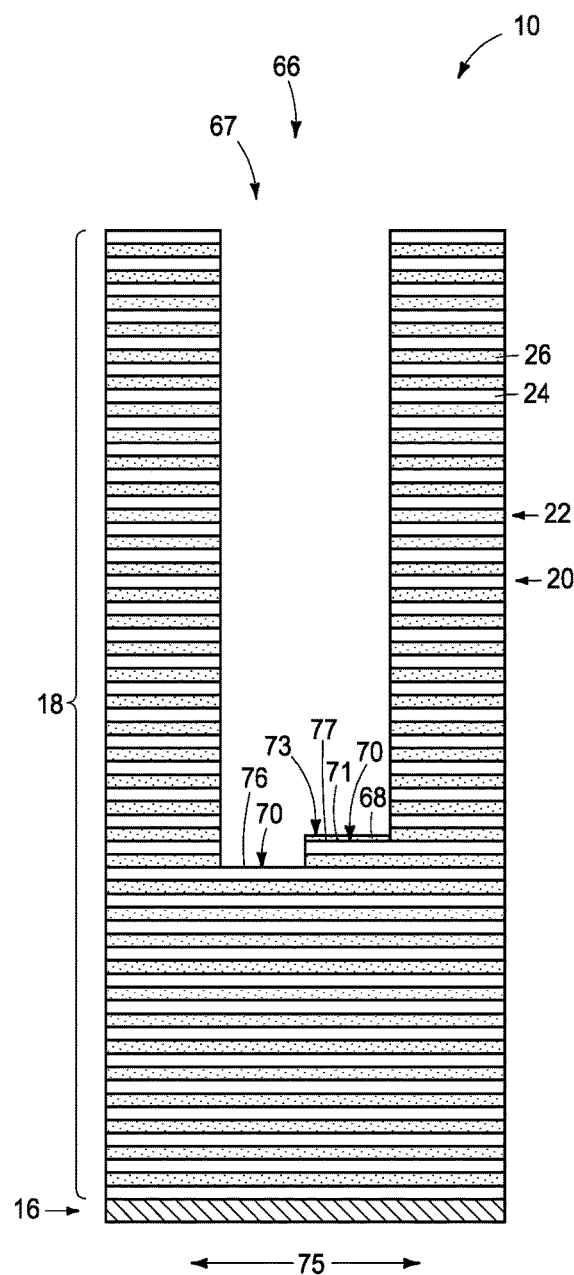
Figure 25:
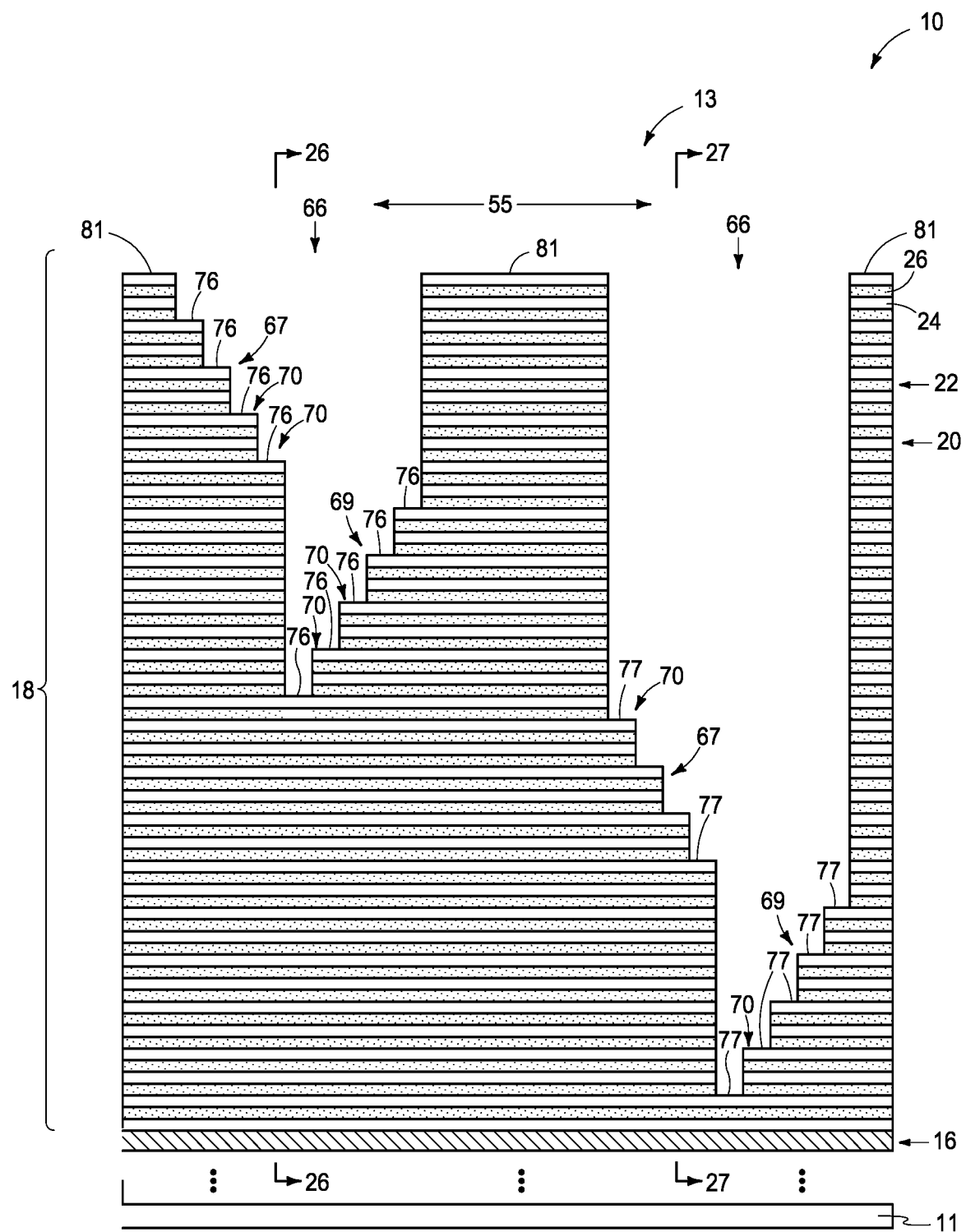
Figure 26:
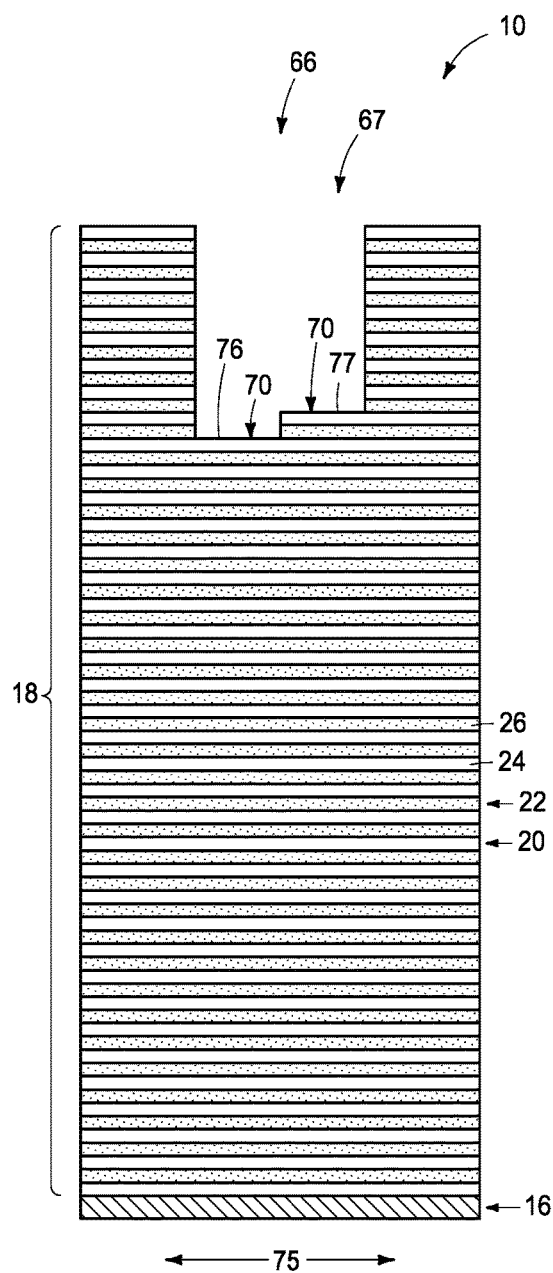
Figure 27:
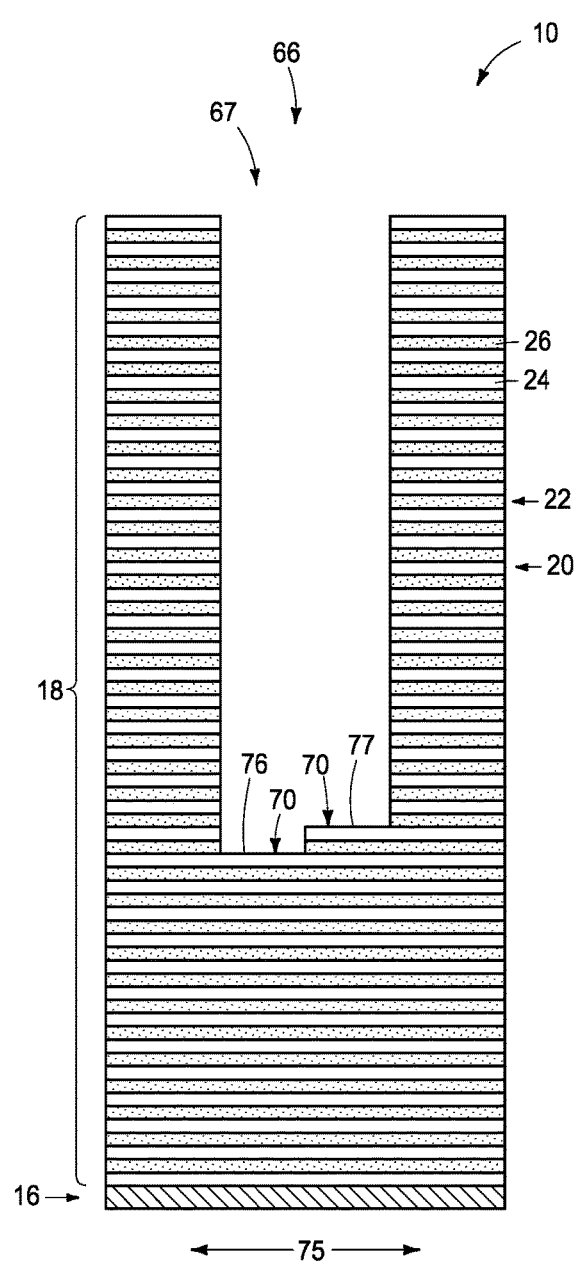
Figure 28:
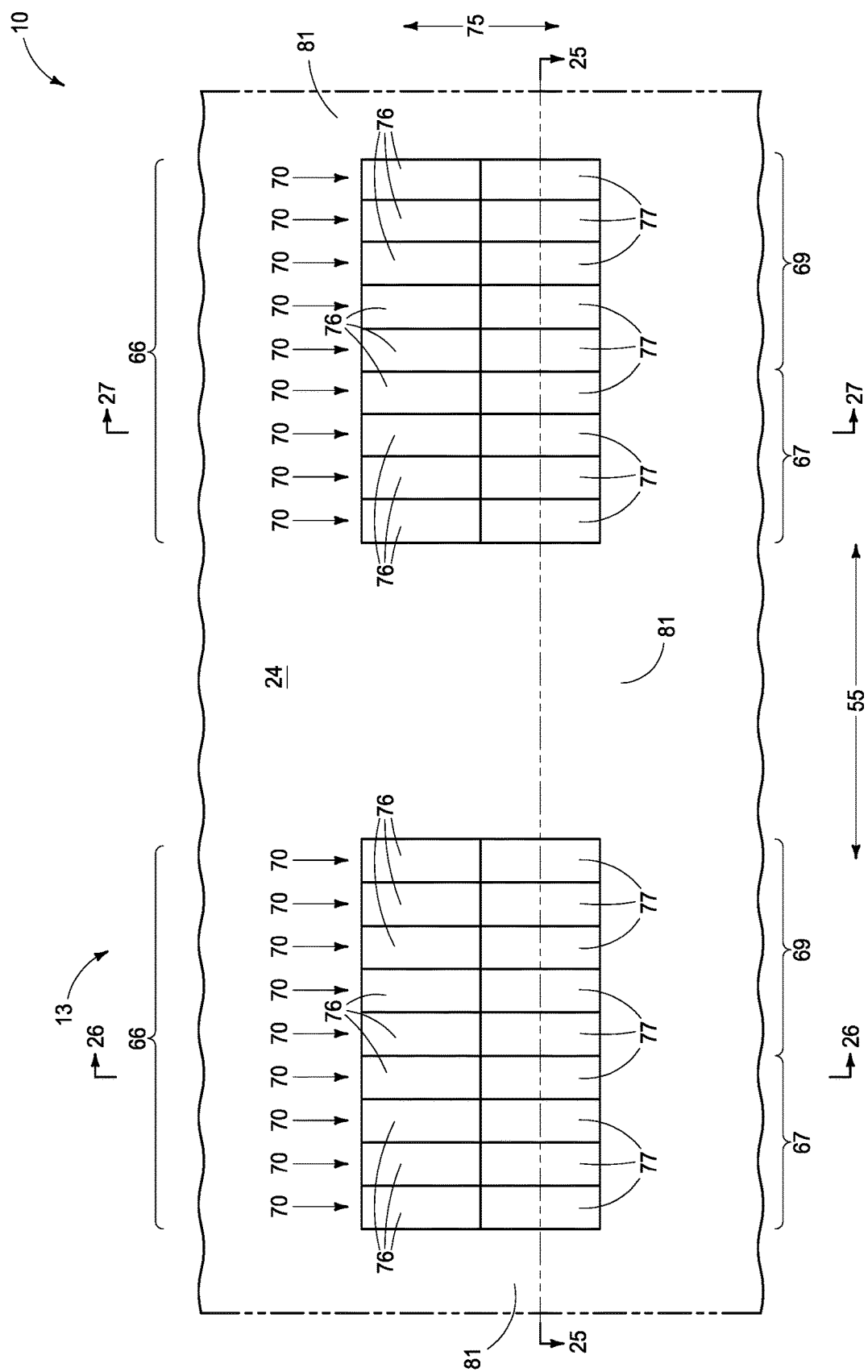
Figure 29:
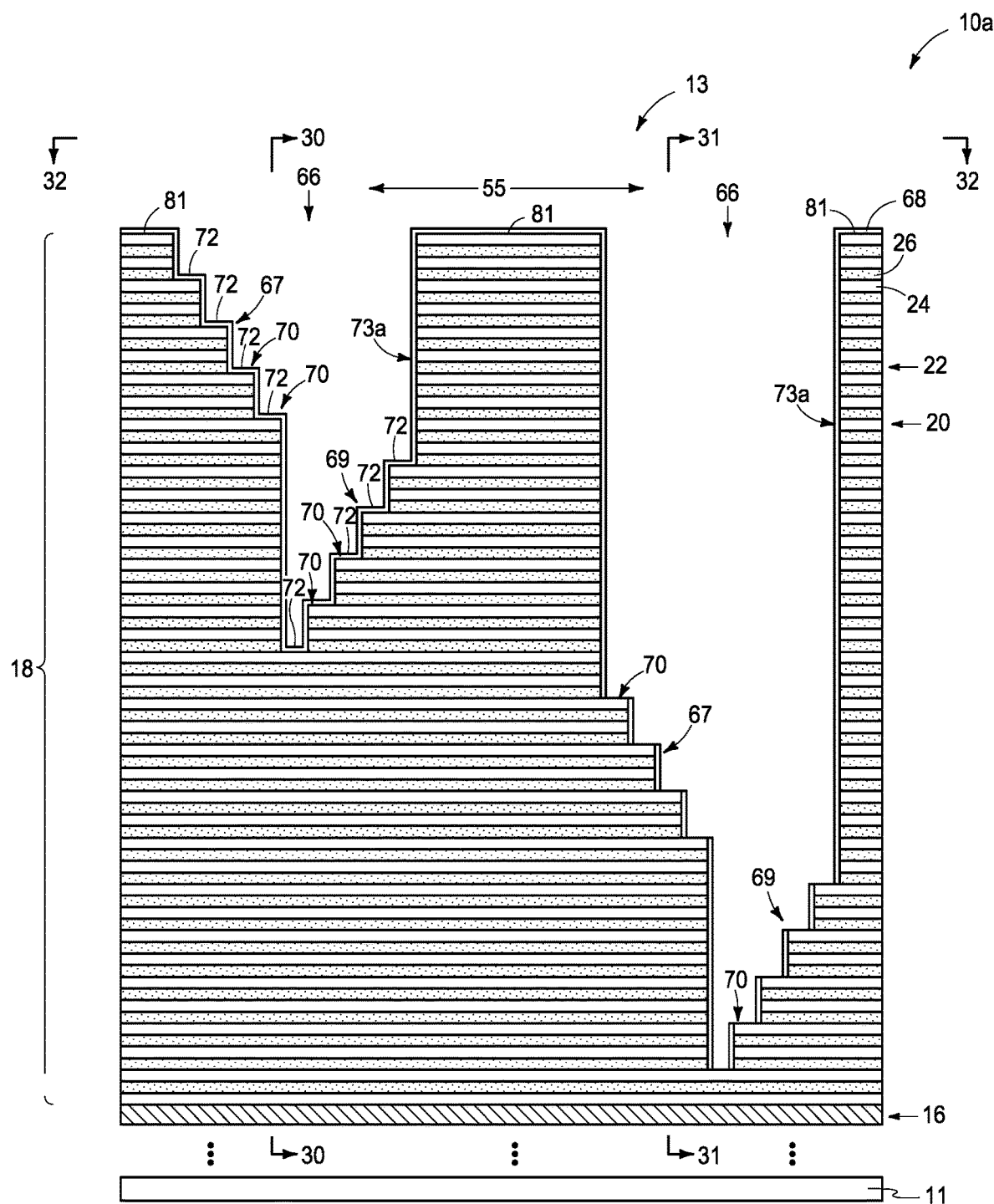
Figure 30:
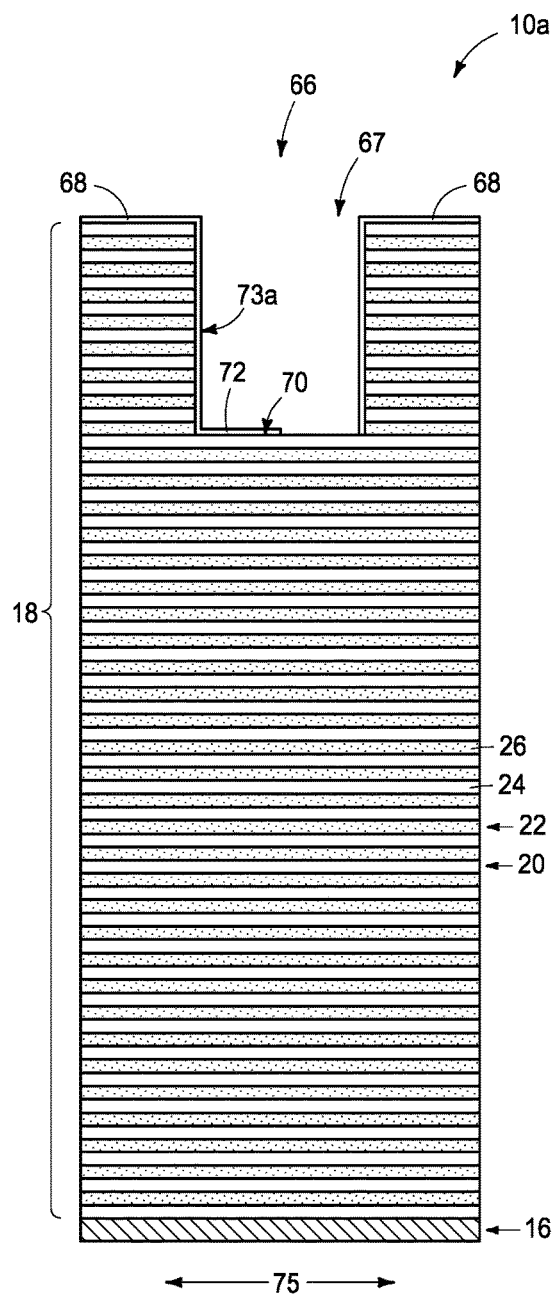
Figure 31:
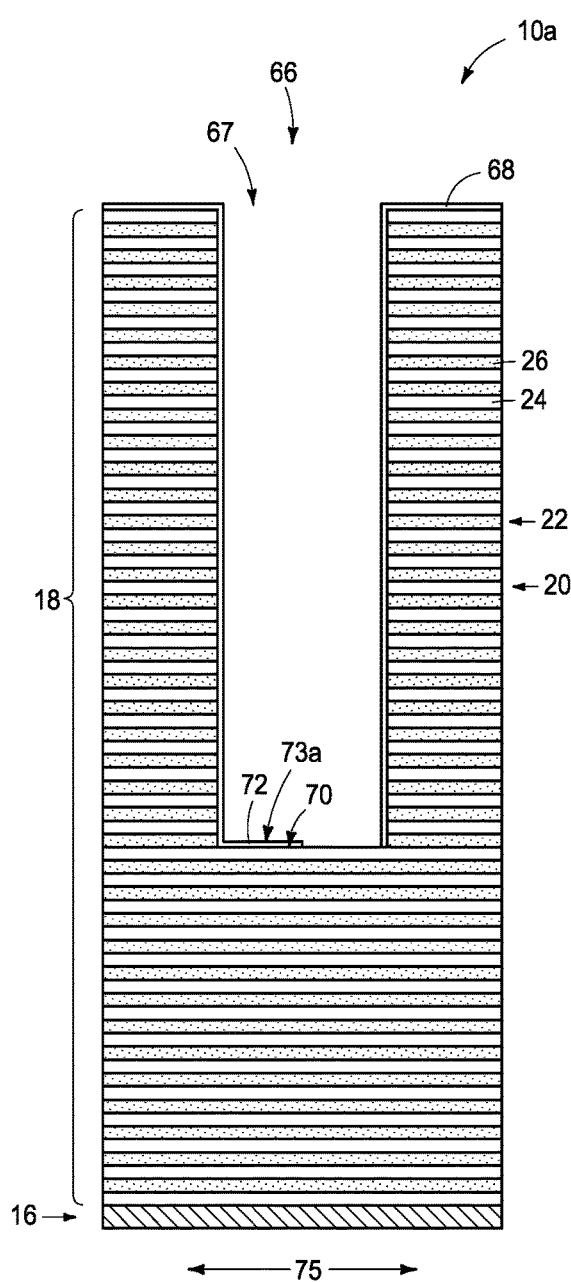
Figure 32:
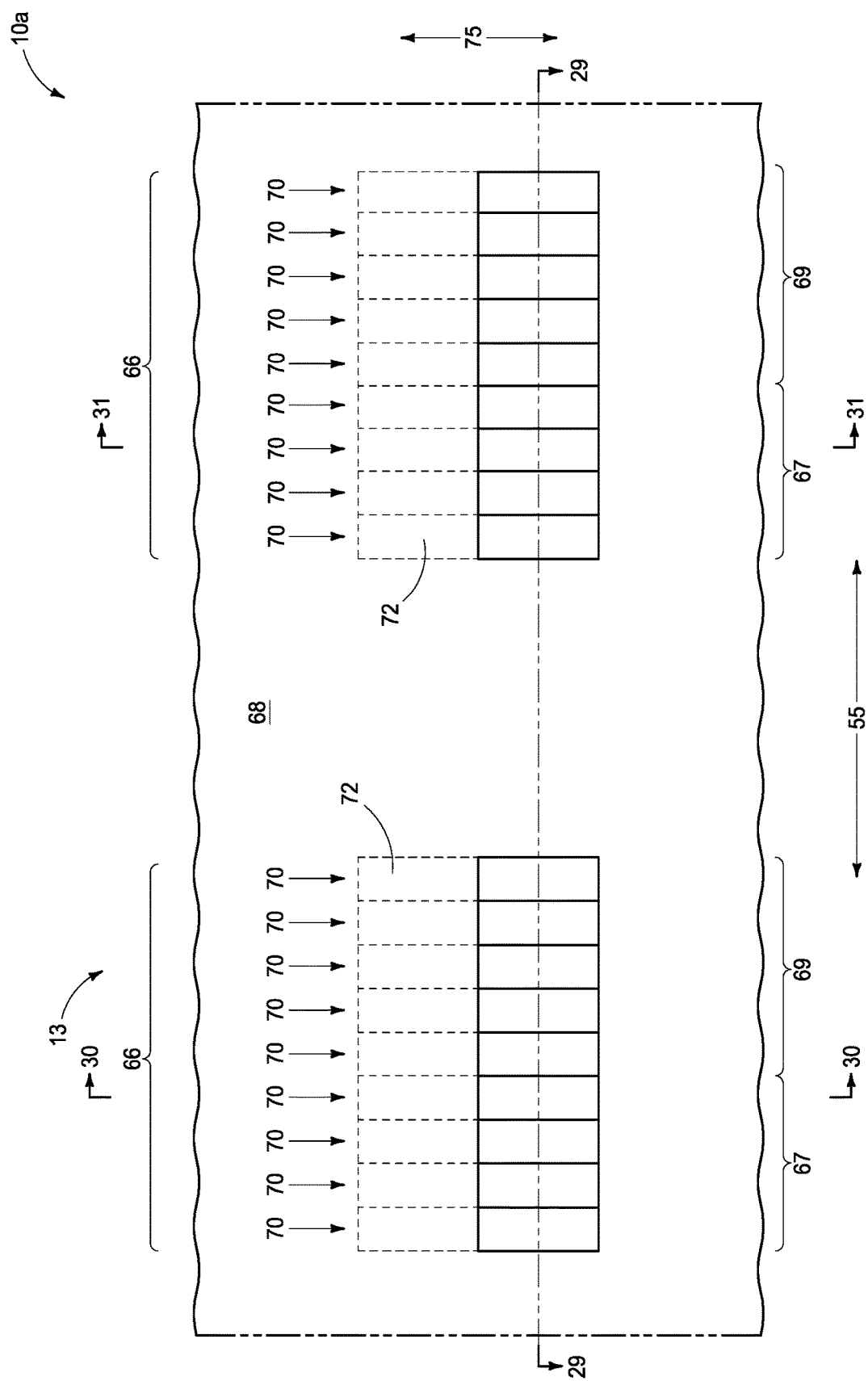
Figure 33:
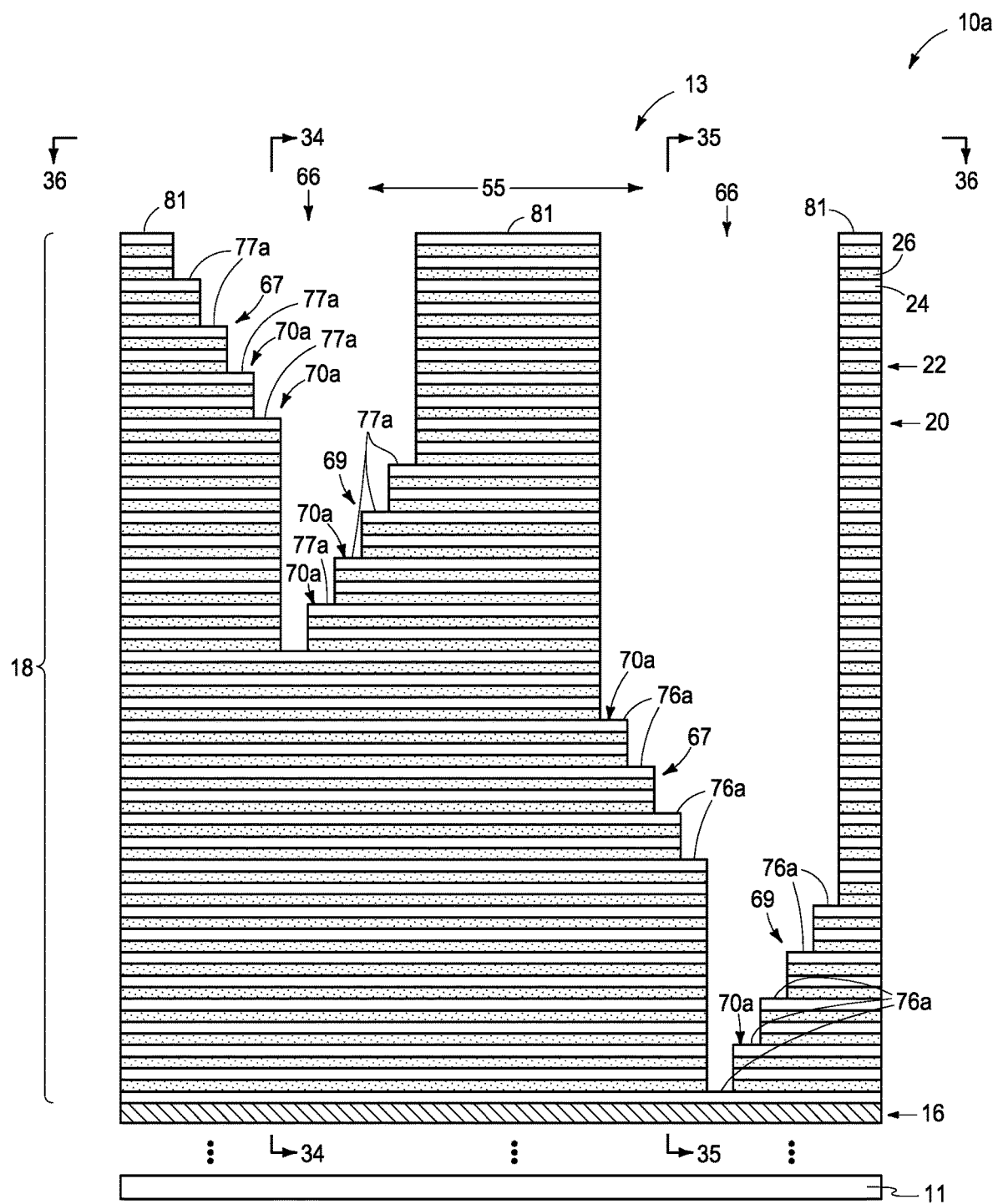
Figure 36:
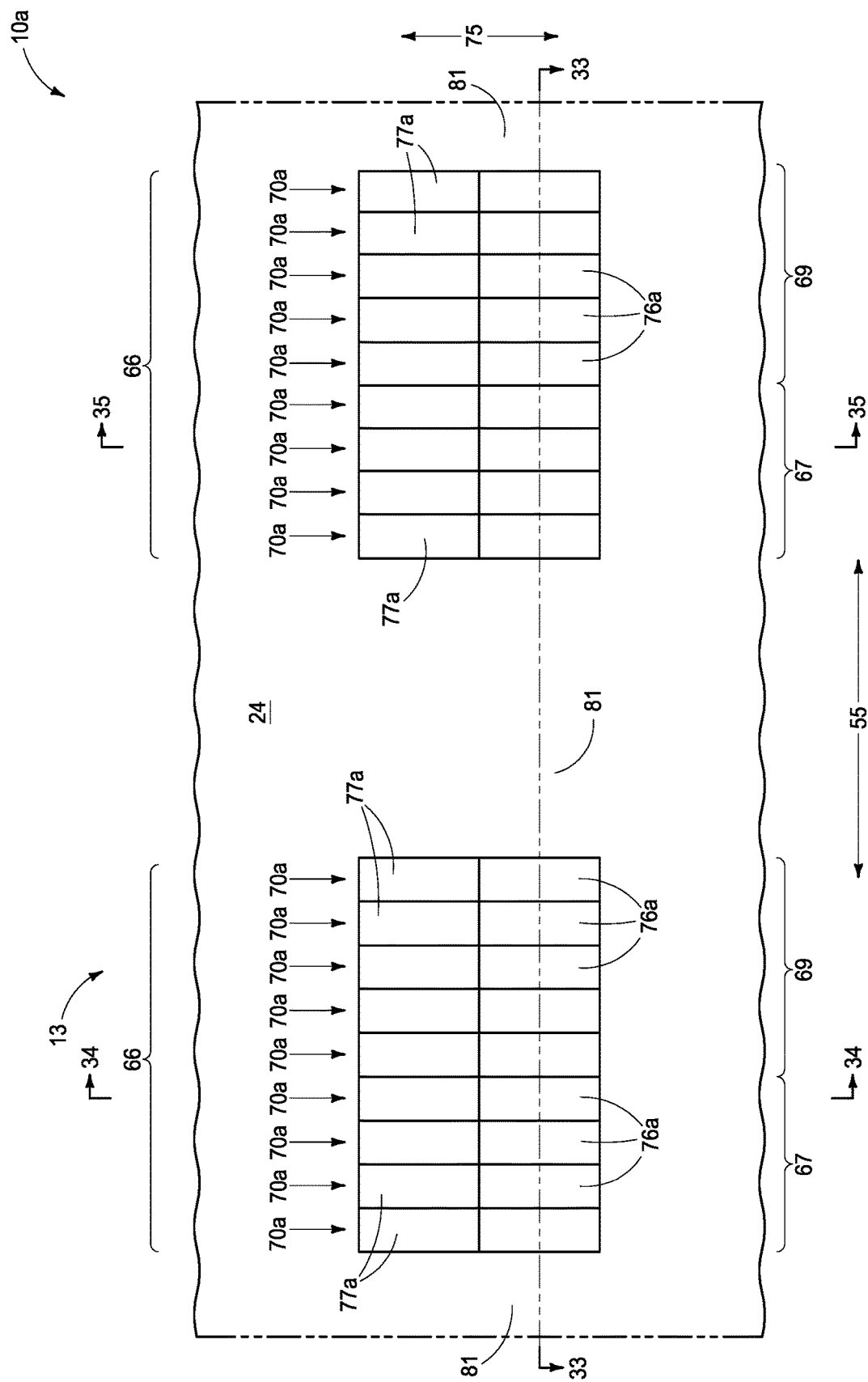
Figure 37:
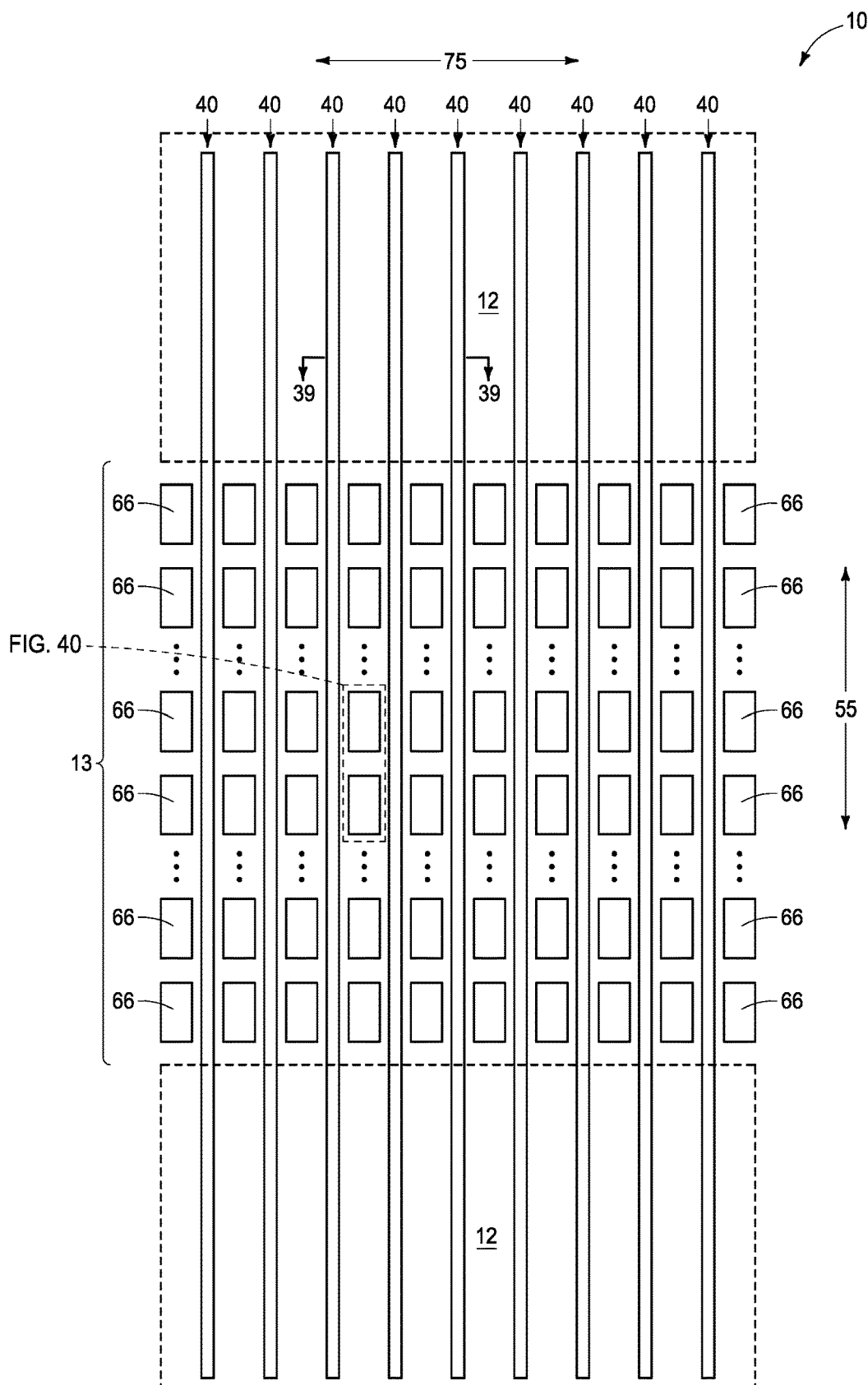
Figure 38:
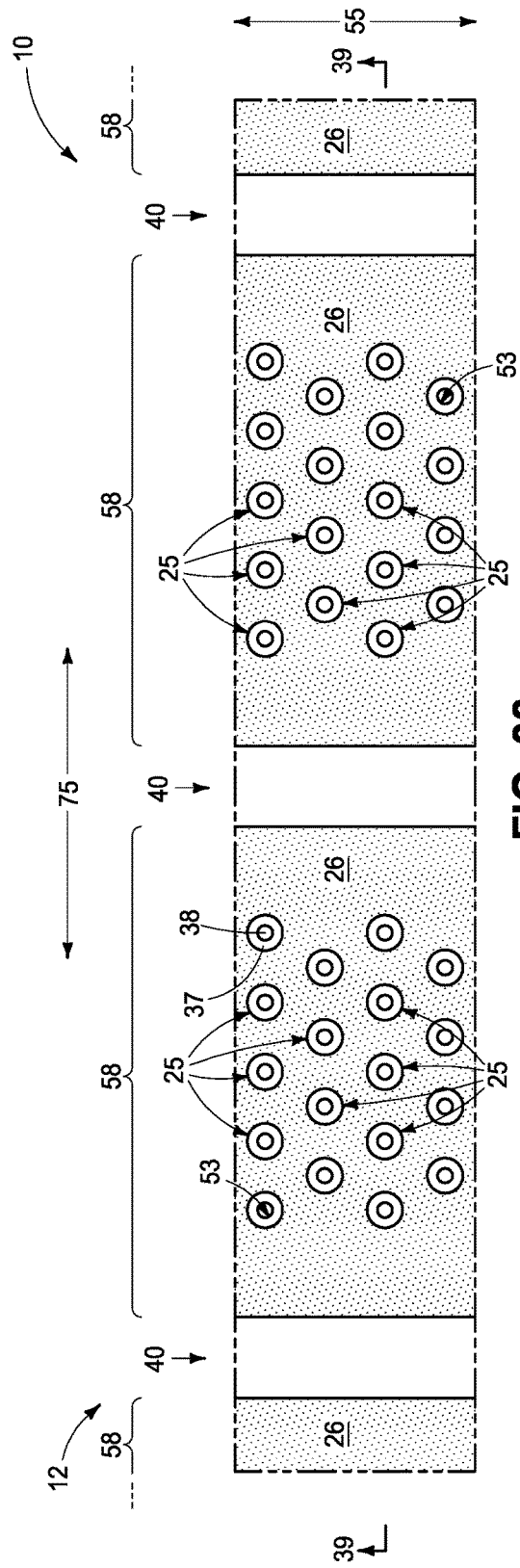
Figure 39:
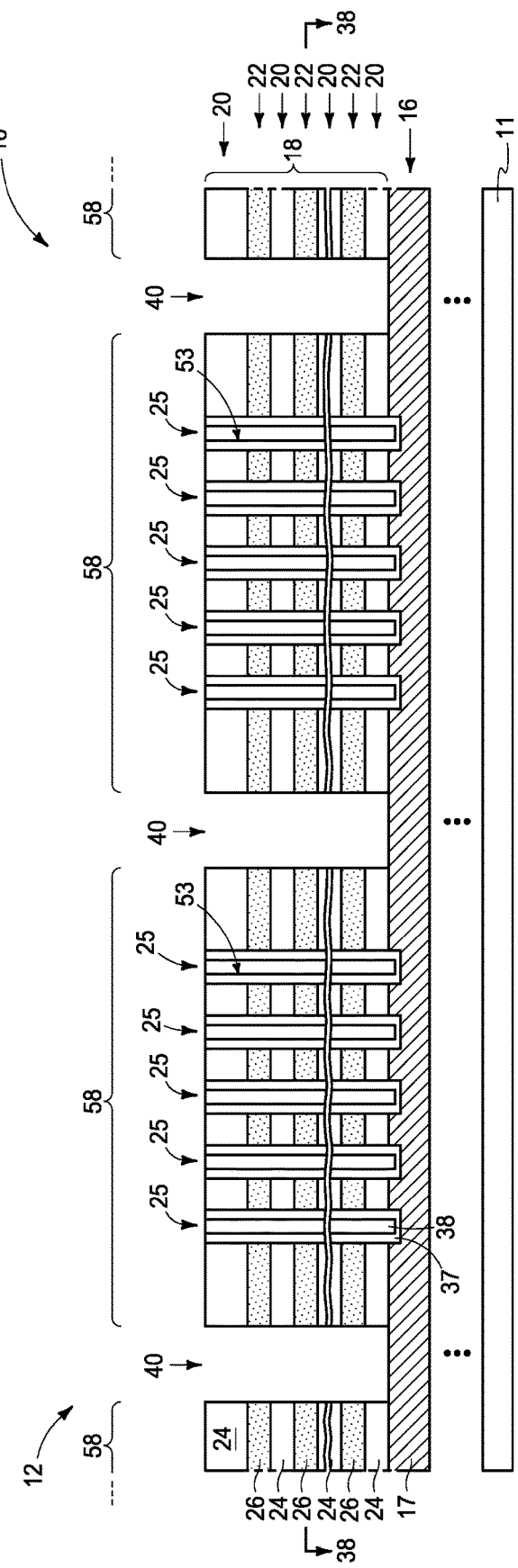
Figure 40:
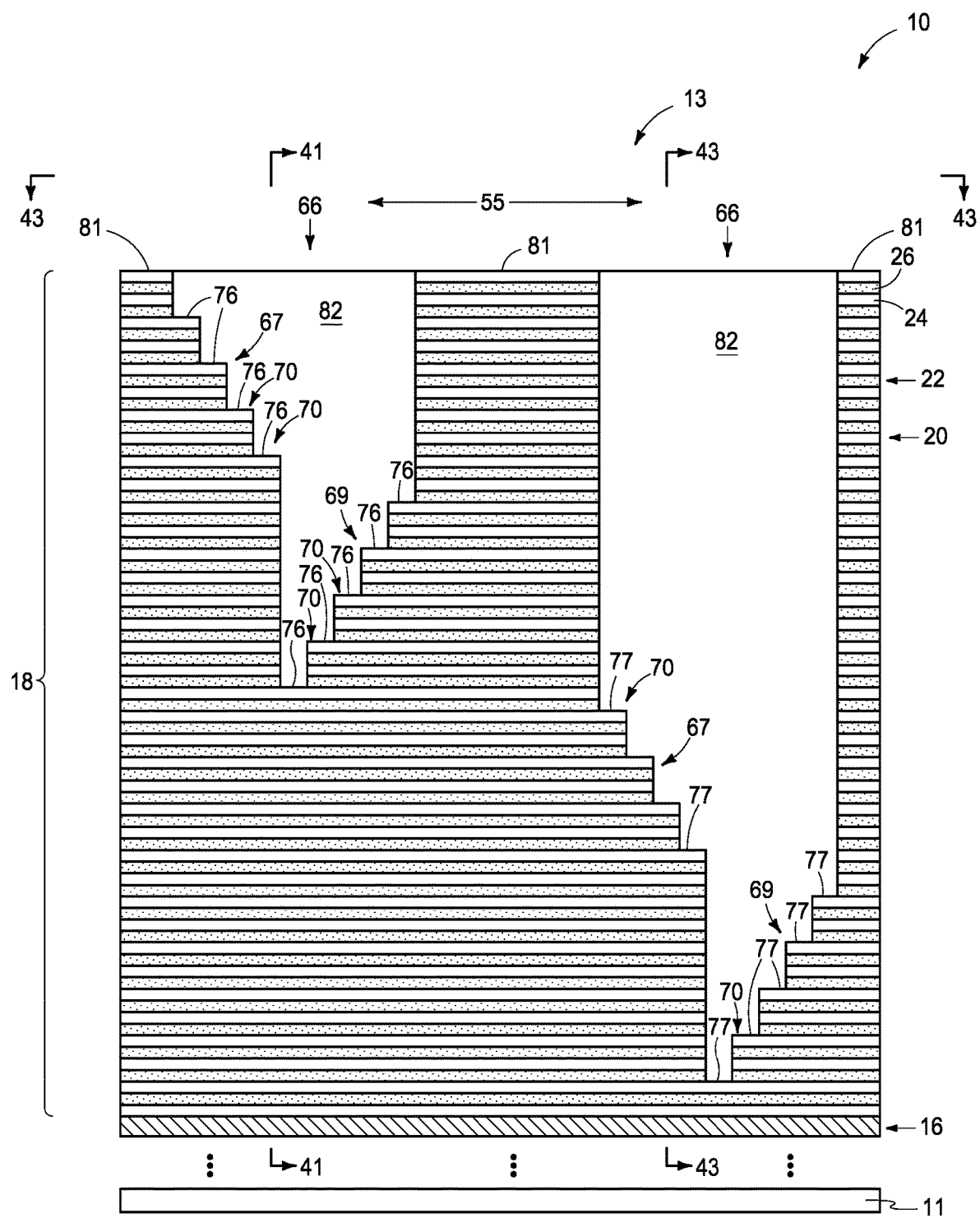
Figure 41:
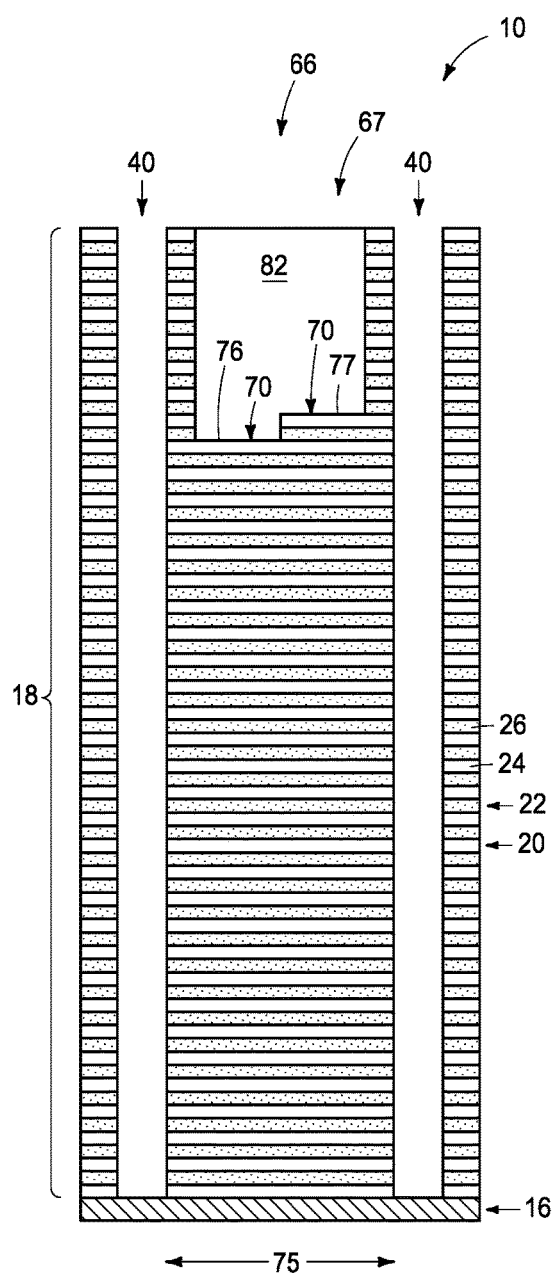
Figure 42:
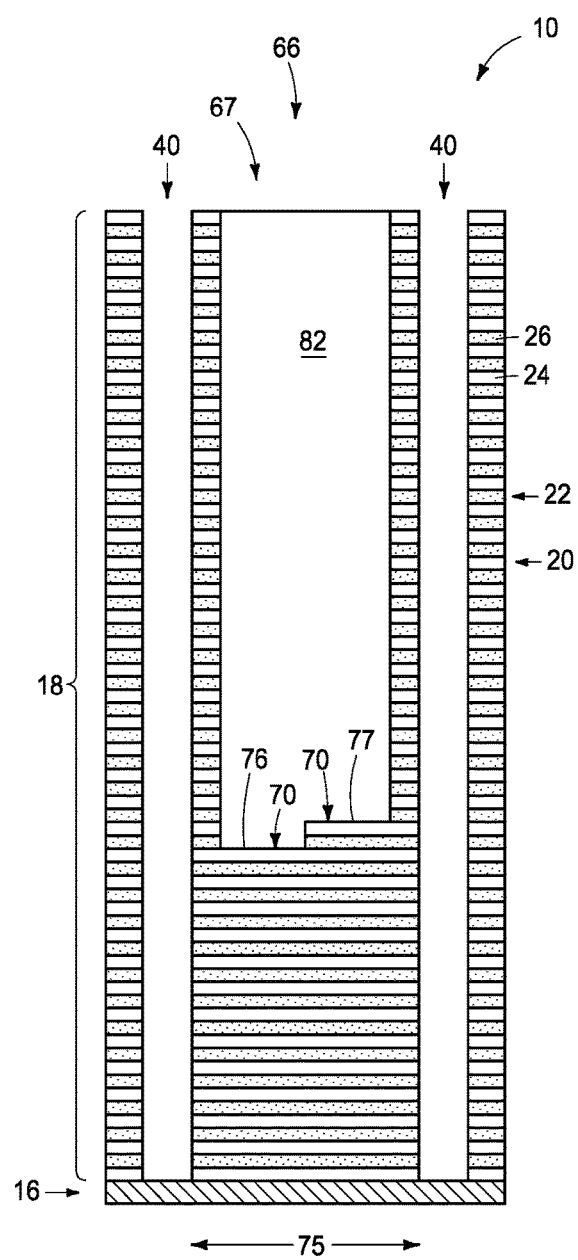
Figure 43:
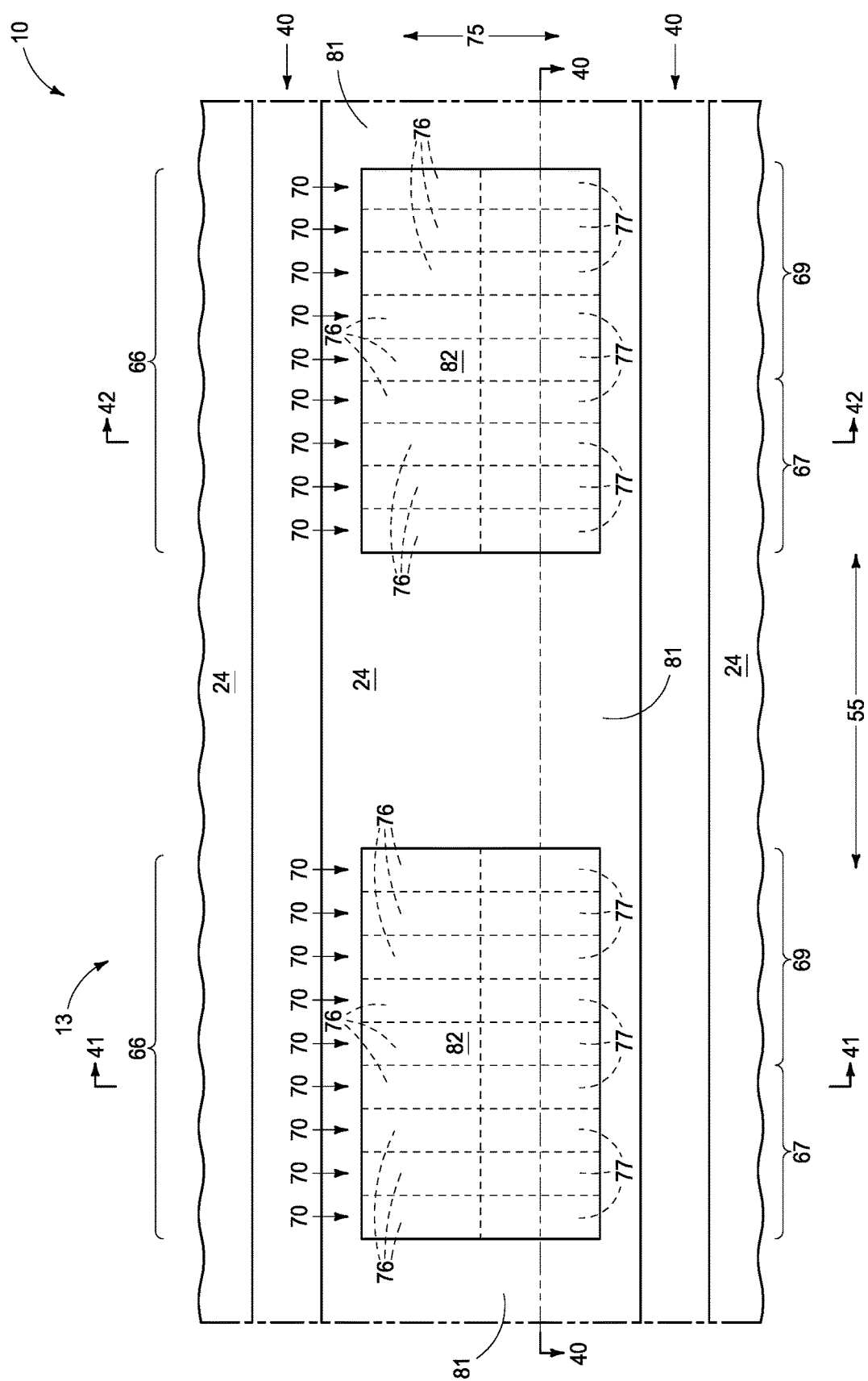
Figure 44:
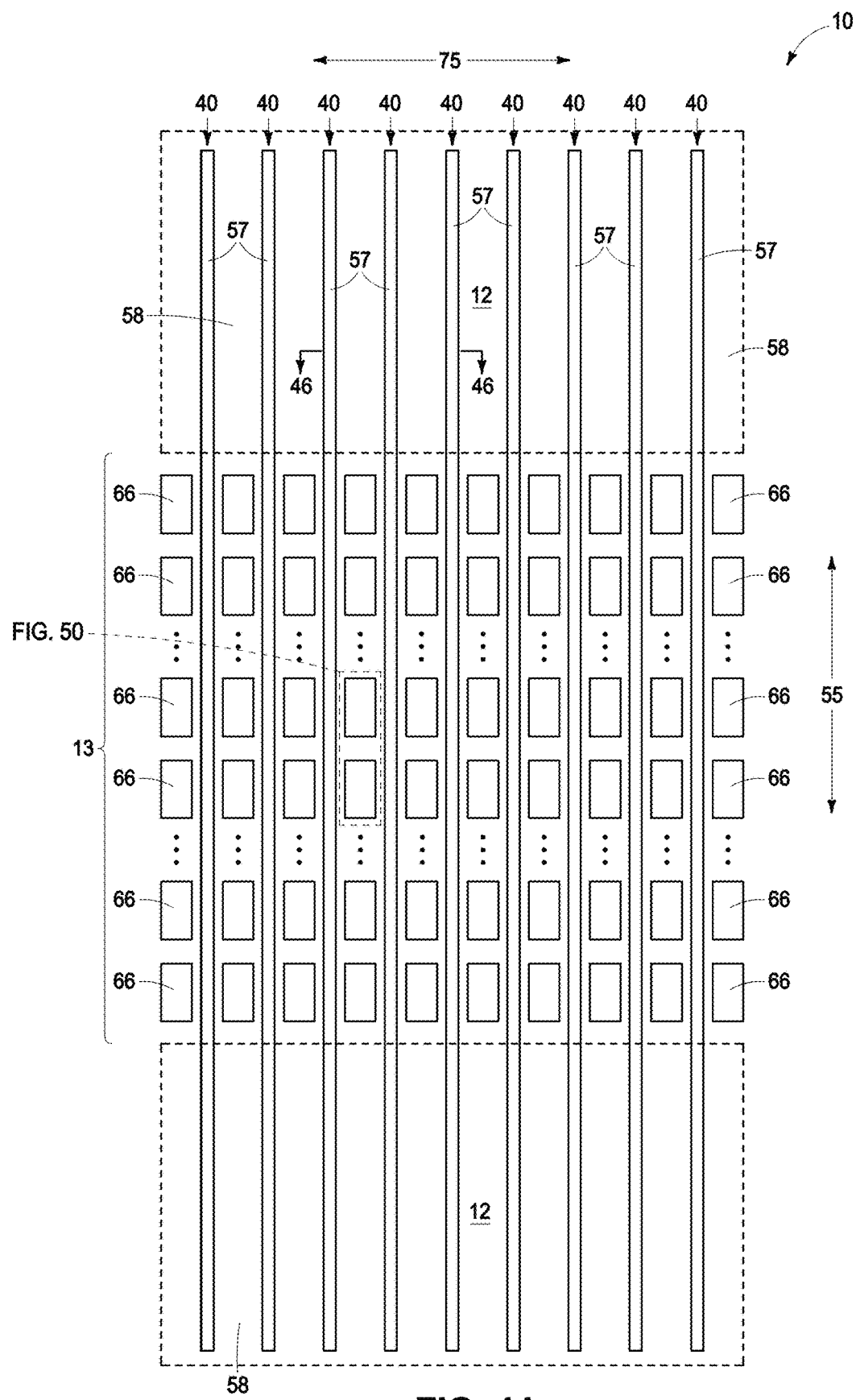
Figure 49:
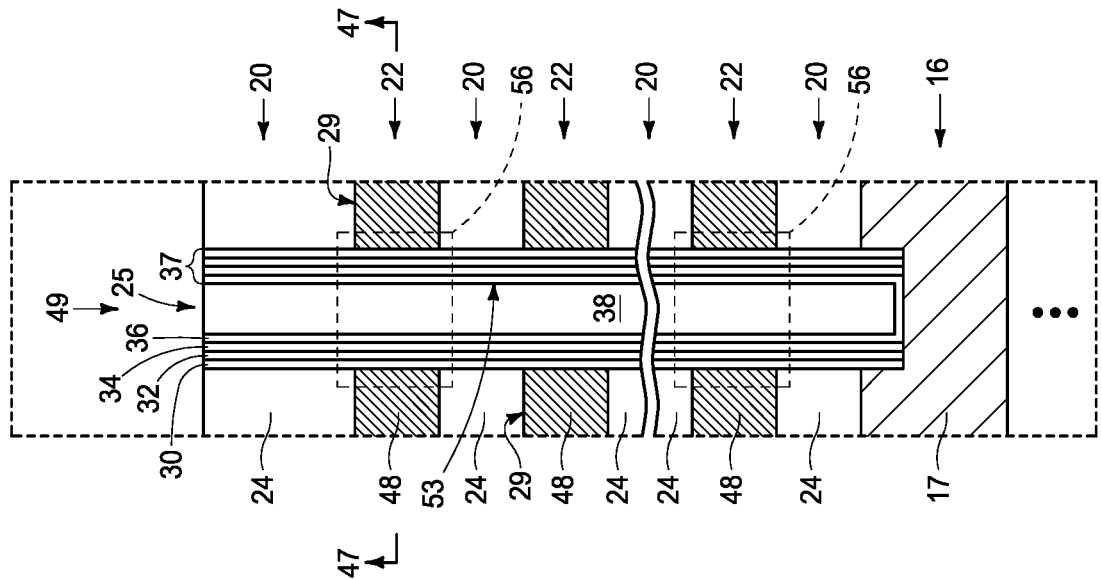
Figure 47:
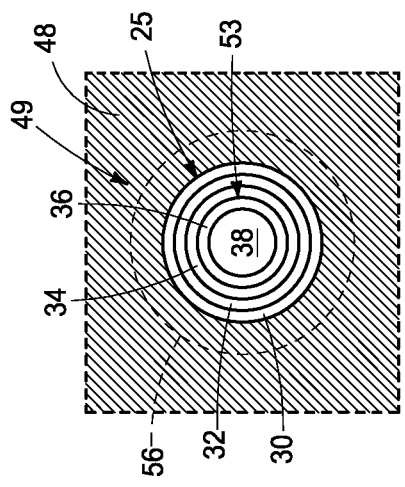
Figure 48:
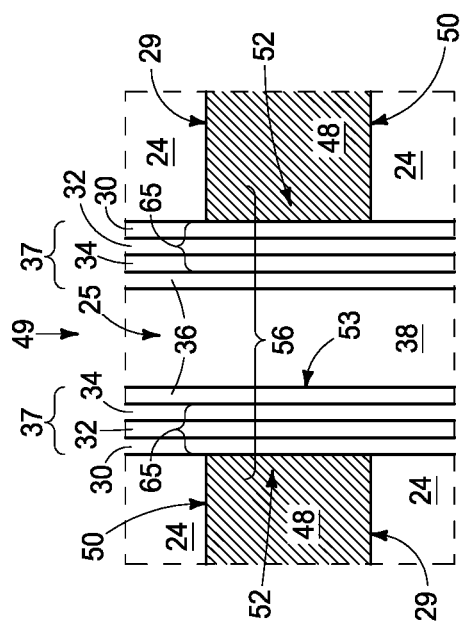
Figure 50:
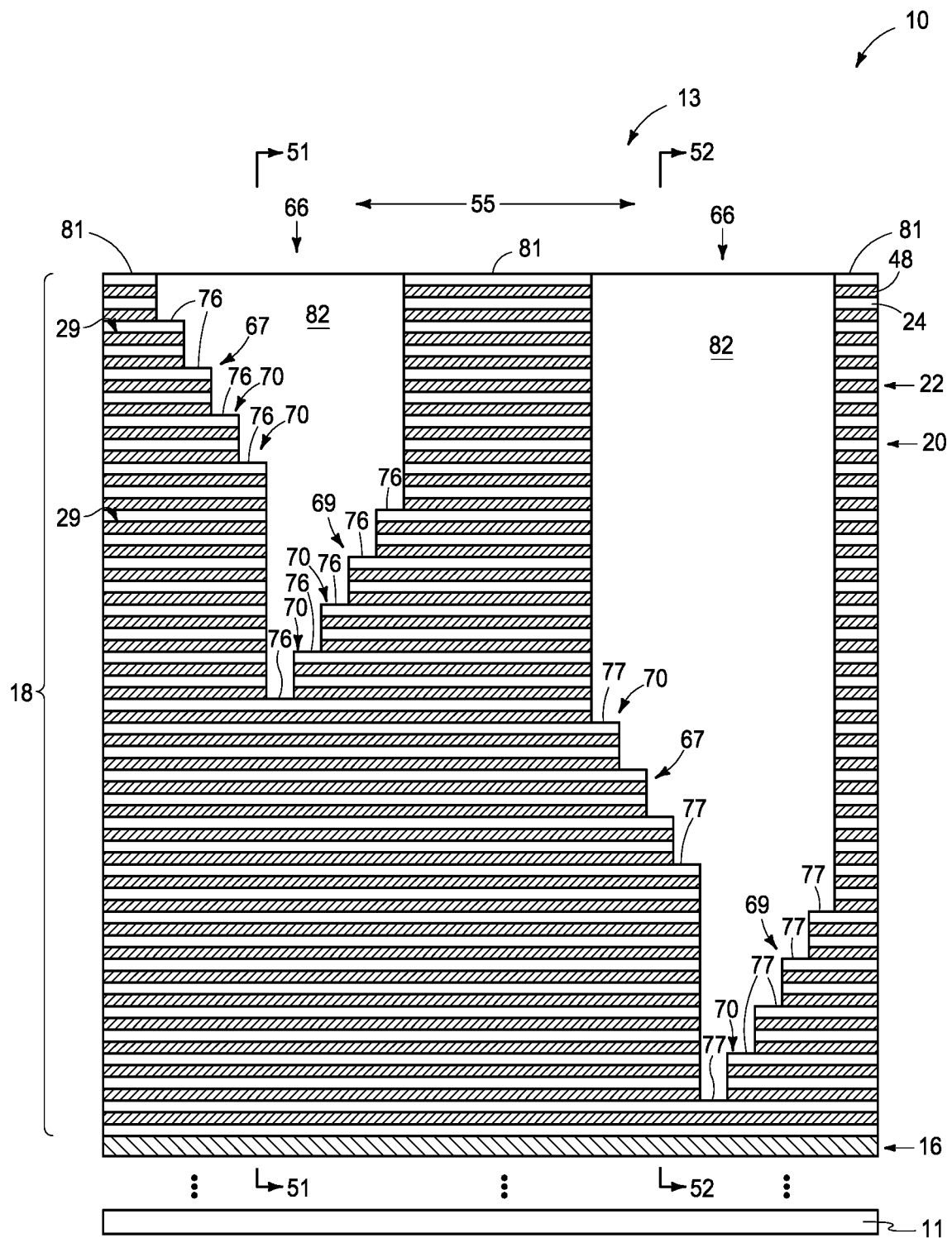
Figure 51:
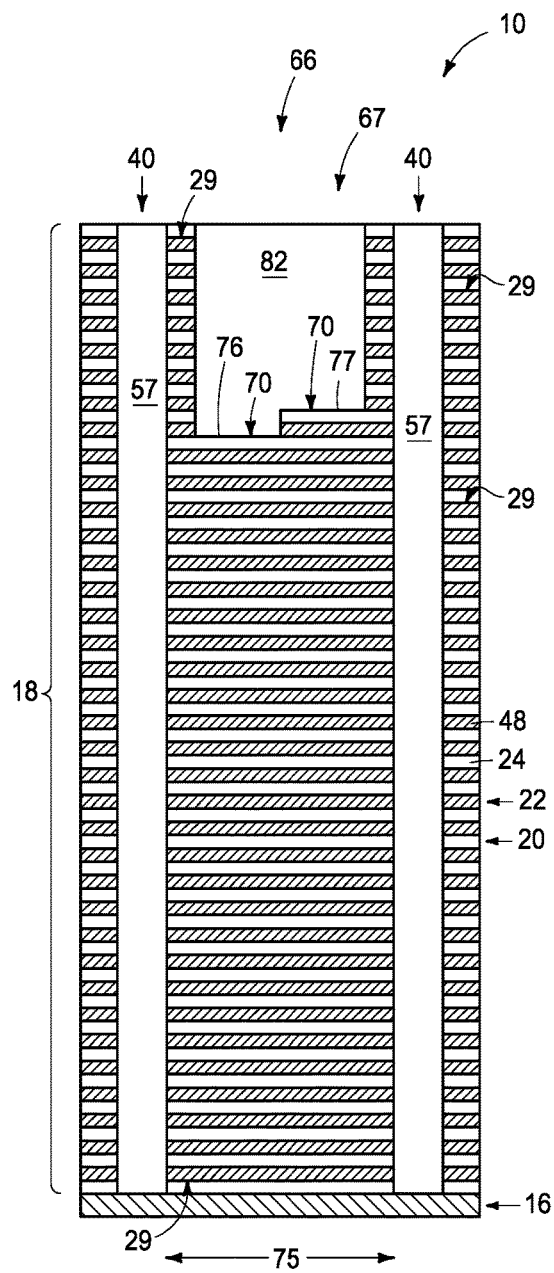
Figure 52:
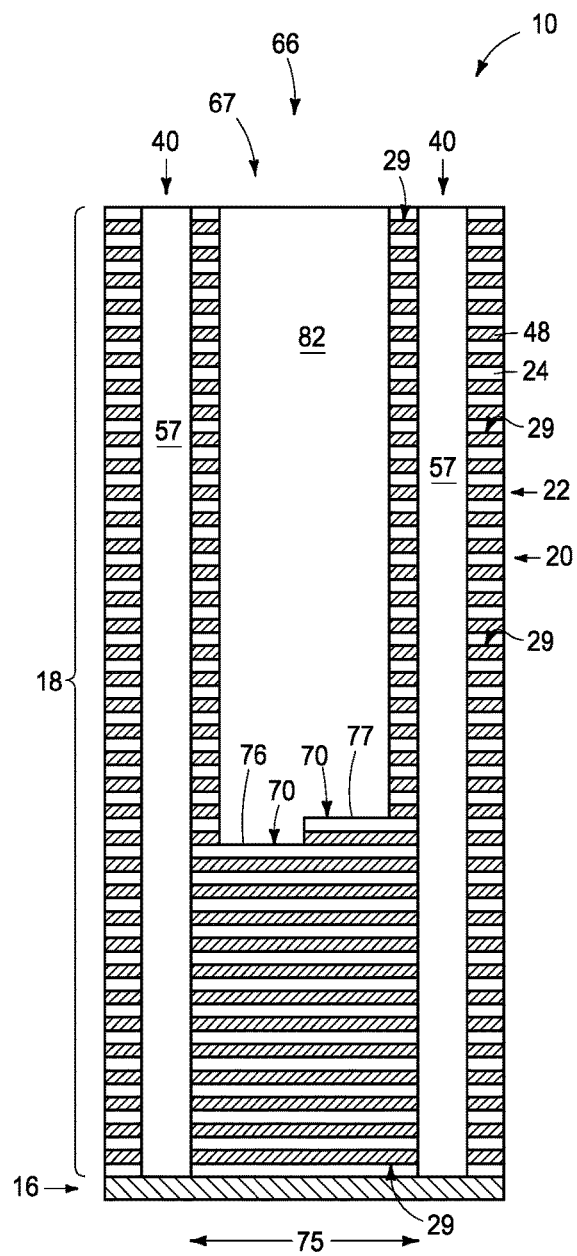
Figure 53:
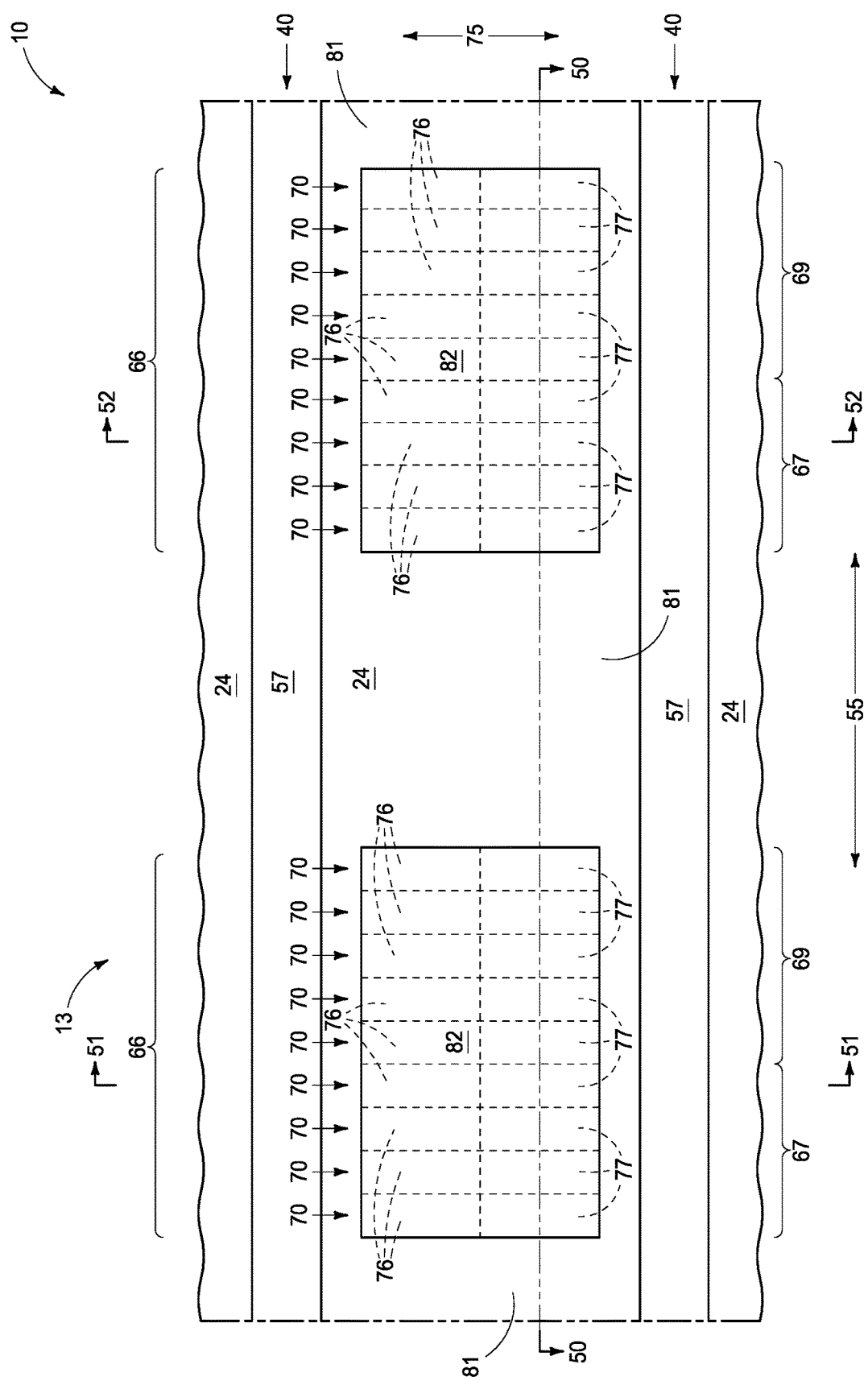
Figure 54:
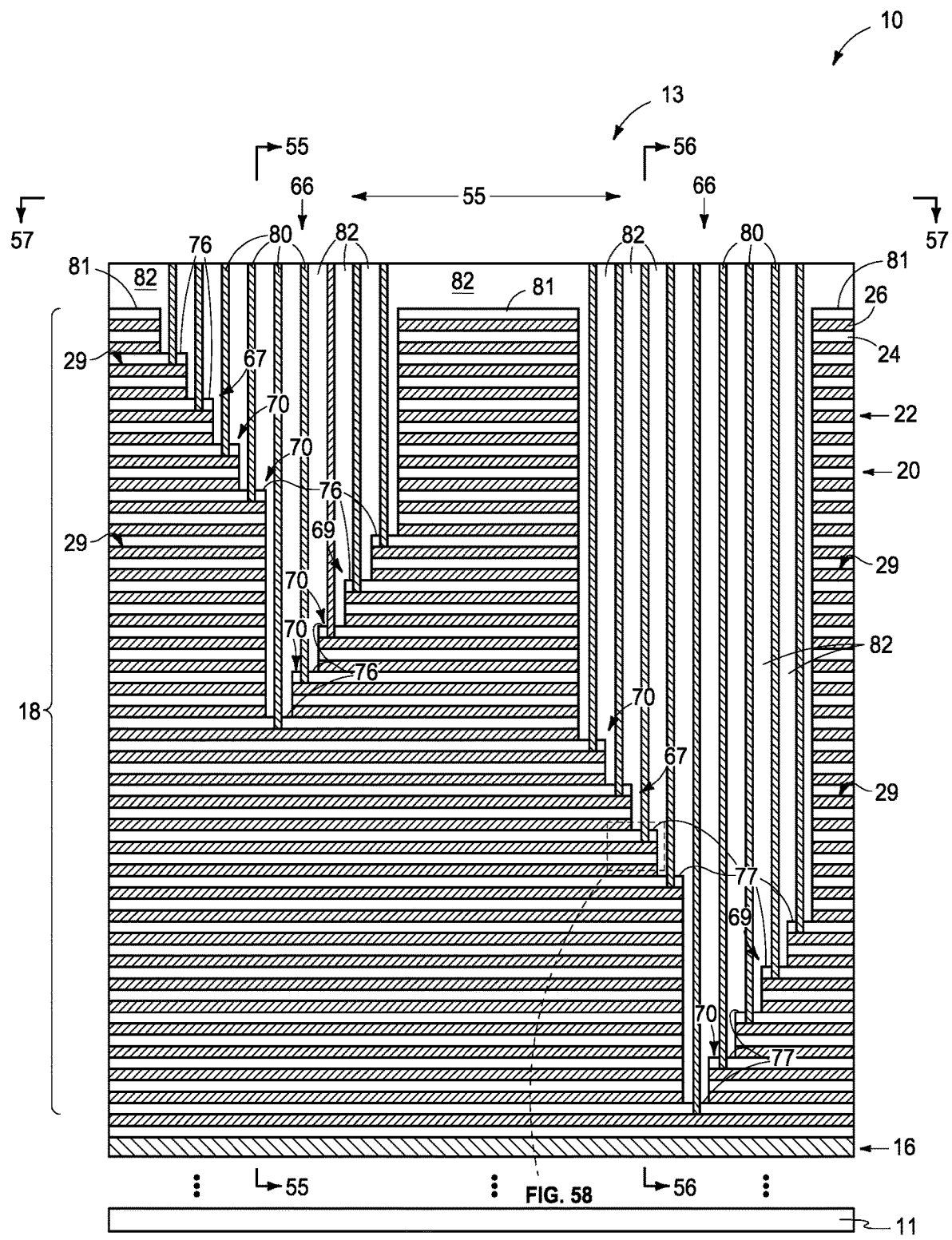
Figure 55:
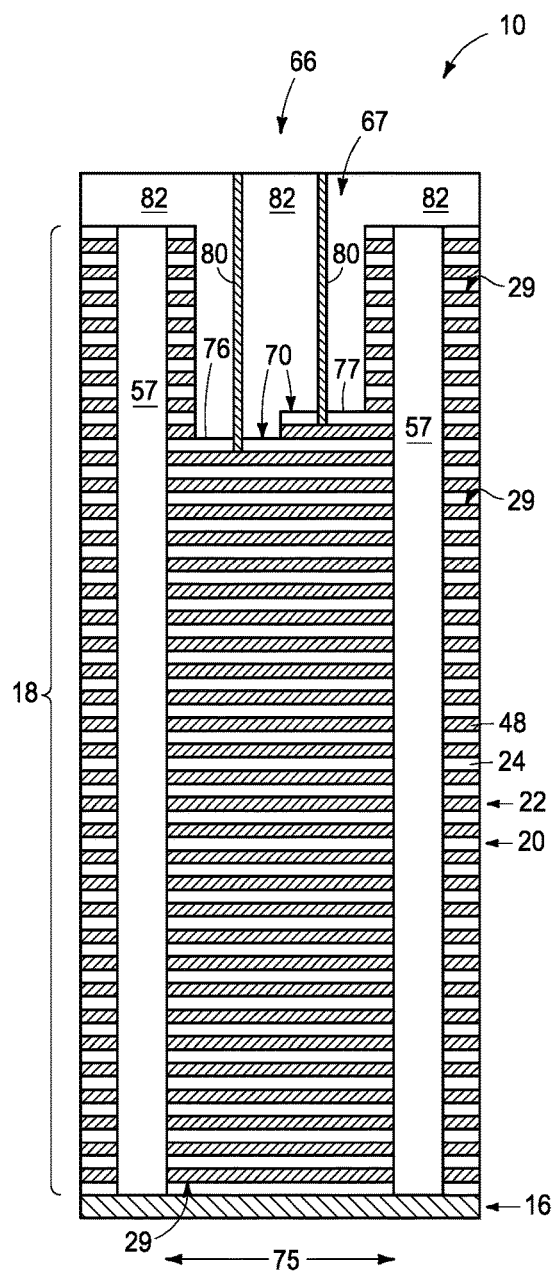
Figure 56:
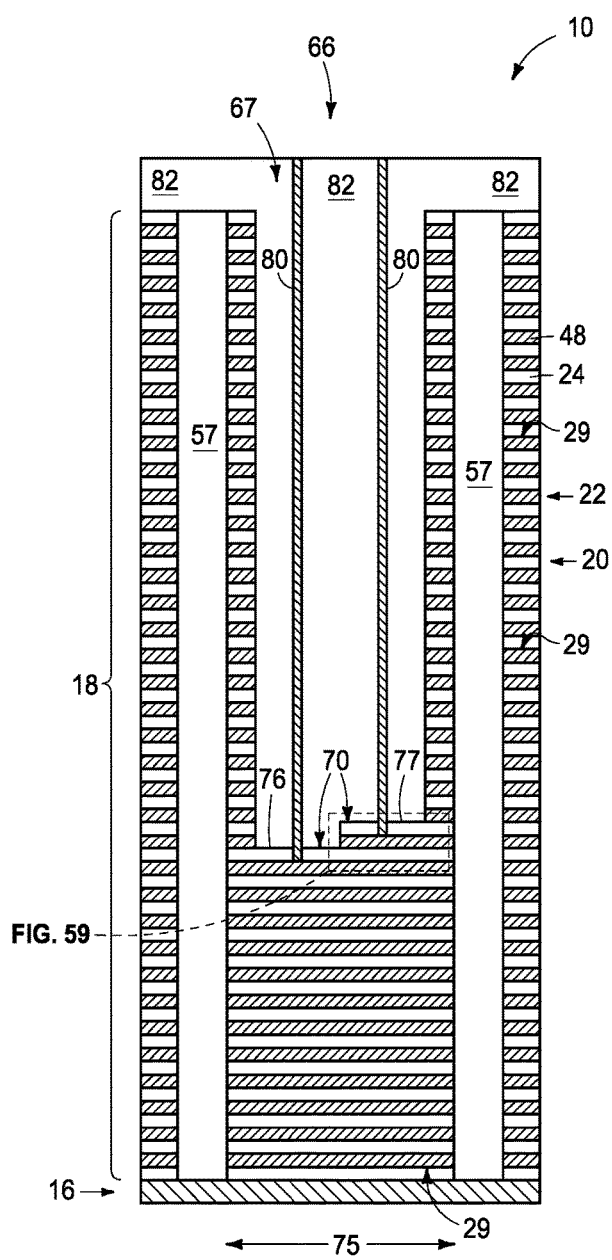
Figure 57:
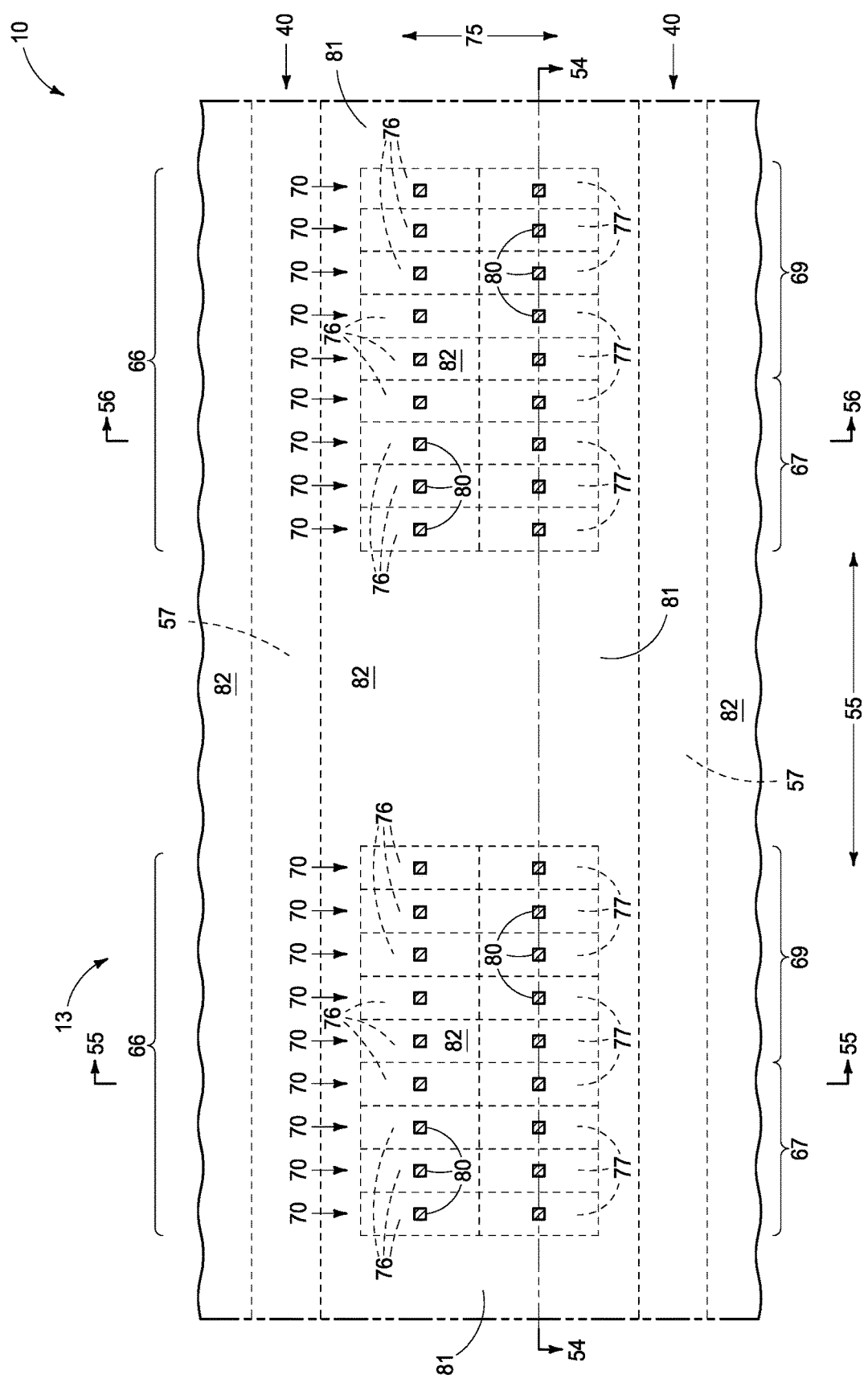

Referring to FIGS. 22-24, and after removing the one of first or second regions 71, 72, respectively, (e.g., region 72), the other of the first and the second regions (e.g., region 71) has been used as a mask 73 while etching through one of first tiers 22 (at least one) and one of second tiers 20 (at least one) in individual stairs 70 to form multiple different-depth treads 76, 77 in individual stairs 70 in a second vertical cross-section (e.g., that of FIG. 23 or FIG. 24) along second direction 75. The thickness of the other of the first and the second regions (e.g., region 71 in the depicted example) may also be reduced (not shown). In one embodiment and as shown, the multiple different-depth treads in the individual stairs are only two in number. Alternately, more than two different-depth treads per stair may be formed (not shown). Crests 81 may be masked or otherwise covered (not shown) to preclude removal of material there-from (no removal being shown). Ideally, as shown, but not required, multiple different-depth treads 76, 77 in individual stairs 70 are formed after all flights 67, 69 have been formed downwardly to their final vertical depths (e.g., by etching; e.g., translated) to preclude potential problems occurring along edges of the memory-block regions in stair-step region 13 that may otherwise occur if treads 76 and 77 were formed before translating such flights downwardly.

Referring to FIGS. 25-28, all remaining of the other of the first and the second regions 71 and 72, respectively, of masking material 68 (not shown) has been removed (e.g., by etching; e.g., the "other" in the depicted example being 71, with neither 71 or 72 now being shown) after the processing shown by FIGS. 22-24 (i.e., such that no part of masking material 68 remains in a finished-circuitry construction in one embodiment [the finished-circuitry construction not shown yet]). Alternately, all of such may not be removed such that some of the other of the first and the second regions 71 and 72, respectively, of masking material 68 remains in the finished-circuitry construction (not shown).

FIGS. 14-28 show an embodiment where the ion implanting is into first region 71, the removing is of second region 72, mask 73 comprises first region 71, and a deeper of the multiple treads (e.g., tread 76) is in the horizontal location (e.g., in "x" and "y" directions) of second region 72. FIGS. 29-36 show an alternate embodiment associated with a construction 10*a* where the ion implanting has still been into first region 71. However, the removing has been of first region 71, mask 73*a* comprises second region 72, and a deeper of the multiple treads (e.g., 76*a* of multiple treads 76*a* and 77*a*) of stairs 70*a* is in the horizontal location of first region 71. Like numerals from the above-described embodiments have been used where appropriate, with some construction differences being indicated with a suffix "a" or with different numerals. For example, the FIGS. 29-36 processing may occur when the predominant implanted species is one or more of antimony, germanium, or argon (at least with respect to silicon nitride or polysilicon being masking material 68 and using $H_3PO_4$ or TMAH, respectively). Any other attribute(s) or aspect(s) as shown and/or described herein with respect to other embodiments may be used.

Referring to FIGS. 37-43, insulative material 82 has been formed directly above stair-step structures 66 (e.g., a combination of a silicon-nitride liner having silicon dioxide thereover). Horizontally-elongated trenches 40 are formed (e.g., by anisotropic etching) into stack 18 (e.g., trenches 40 being between immediately-laterally-adjacent memory-block regions 58). Trenches 40 will typically be wider than channel openings 25 (e.g., 3 to 10 times wider). Trenches 40 may have respective bottoms that are directly against conductor material 17 (e.g., atop or within) of conductor tier 16 (as shown) or may have respective bottoms that are above conductor material 17 of conductor tier 16 (not shown). Trenches 40 may taper laterally-inward and/or outward in vertical cross-section (not shown). In one embodiment and as shown, trenches 40 extend along first direction 55 from one of two memory-array regions 12 into the other of two memory-array regions 12 across stair-step region 13.

Referring to FIGS. 44-53, material 26 (not shown) of first tiers 22 has been removed, for example by being isotropically etched away through trenches 40 ideally selectively relative to the other exposed materials (e.g., using liquid or vapor $H_3PO_4$ as a primary etchant where material 26 is silicon nitride and other materials comprise one or more oxides or polysilicon). Material 26 (not shown) in conductive tiers 22 in the example embodiment is sacrificial and has been replaced with conducting material 48, and which has thereafter been removed from trenches 40, thus forming individual conductive lines 29 (e.g., wordlines) and elevationally-extending strings 49 of individual transistors and/or memory cells 56. In the example embodiment, individual conductive lines 29 extend across stair-step region 13 along first direction 55 into and within individual memory blocks 58 in each of two memory-array regions 12.

A thin insulative liner (e.g., $Al_2O_3$ and not shown) may be formed before forming conducting material 48. Approximate locations of transistors and/or memory cells 56 are indicated with a bracket in some figures and some with dashed outlines in some figures, with transistors and/or memory cells 56 being essentially ring-like or annular in the depicted example. Alternately, transistors and/or memory cells 56 may not be completely encircling relative to individual channel openings 25 such that each channel opening 25 may have two or more elevationally-extending strings 49 (e.g., multiple transistors and/or memory cells about individual channel openings in individual conductive tiers with perhaps multiple wordlines per channel opening in individual conductive tiers, and not shown). Conducting material 48 may be considered as having terminal ends 50 corresponding to control-gate regions 52 of individual transistors and/or memory cells 56. Control-gate regions 52 in the depicted embodiment comprise individual portions of individual conductive lines 29. Materials 30, 32, and 34 may be considered as a memory structure 65 that is laterally between control-gate region 52 and channel material 36. In one embodiment and as shown with respect to the example "gate-last" processing, conducting material 48 of conductive tiers 22 is formed after forming channel openings 25 and/or trenches 40. Alternately, the conducting material of the conductive tiers may be formed before forming channel openings 25 and/or trenches 40 (not shown), for example with respect to "gate-first" processing.

A charge-blocking region (e.g., charge-blocking material 30) is between storage material 32 and individual control-gate regions 52. A charge block may have the following functions in a memory cell: In a program mode, the charge block may prevent charge carriers from passing out of the storage material (e.g., floating-gate material, charge-trapping material, etc.) toward the control gate, and in an erase mode the charge block may prevent charge carriers from flowing into the storage material from the control gate. Accordingly, a charge block may function to block charge migration between the control-gate region and the storage material of individual memory cells. An example charge-blocking region as shown comprises insulator material 30.

By way of further examples, a charge-blocking region may comprise a laterally (e.g., radially) outer portion of the storage material (e.g., material 32) where such storage material is insulative (e.g., in the absence of any different-composition material between an insulative storage material 32 and conducting material 48). Regardless, as an additional example, an interface of a storage material and conductive material of a control gate may be sufficient to function as a charge-blocking region in the absence of any separate-composition-insulator material 30. Further, an interface of conducting material 48 with material 30 (when present) in combination with insulator material 30 may together function as a charge-blocking region, and as alternately or additionally may a laterally-outer region of an insulative storage material (e.g., a silicon nitride material 32). An example material 30 is one or more of silicon hafnium oxide and silicon dioxide.

Walls 57 have been formed in individual trenches 40 between what are now immediately-laterally-adjacent memory blocks 58. In one embodiment and as shown, walls 57 extend in first direction 55 from one of two memory-array regions 12 into the other of two memory-array regions 12 across stair-step region 13. Walls 57 may provide lateral electrical isolation (insulation) between immediately-laterally-adjacent memory blocks and between immediately-laterally-adjacent stair-step structures 66. Walls 57 may include one or more of insulative, semiconductive, and conducting materials and, regardless, may facilitate conductive tiers 22 from shorting relative one another in a finished circuitry construction. Example insulative materials are one or more of $SiO_2$, $Si_3N_4$, and $Al_2O_3$. Walls 57 may include through array vias (TAVs, and not shown).

Multiple different-depth treads 76 and 77 in individual stairs 70 now individually comprise conducting material 48 of one of conductive tiers 22.

Referring to FIGS. 54-57, conductive vias 80 have been formed (e.g., through insulative material 82) and that are individually directly above and directly against conducting material 48 that is in the respective individual treads 76, 77. More insulative material 82 may be formed prior to forming conductive vias 80 (as shown). Conductive vias 80 may be routed horizontally (not shown) above stack 18 and connect with individual TAVs (not shown) that extend through stack 18 to circuitry there-below. Such TAVs may extend through walls 57 and/or one or more stairs 70 and are not shown in the drawings for clarity as to what is shown and largely directed to aspects of the invention.

Figure 58:
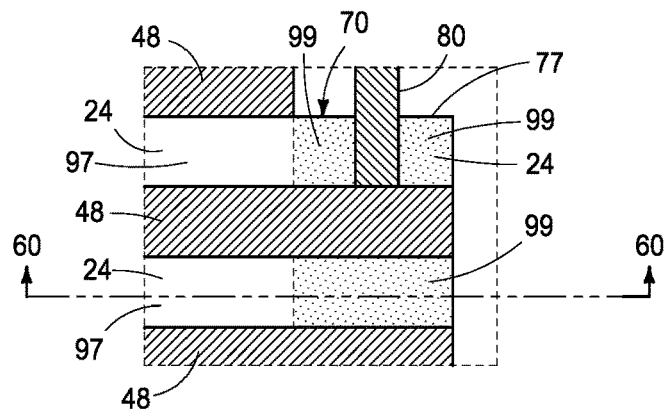
Figure 59:
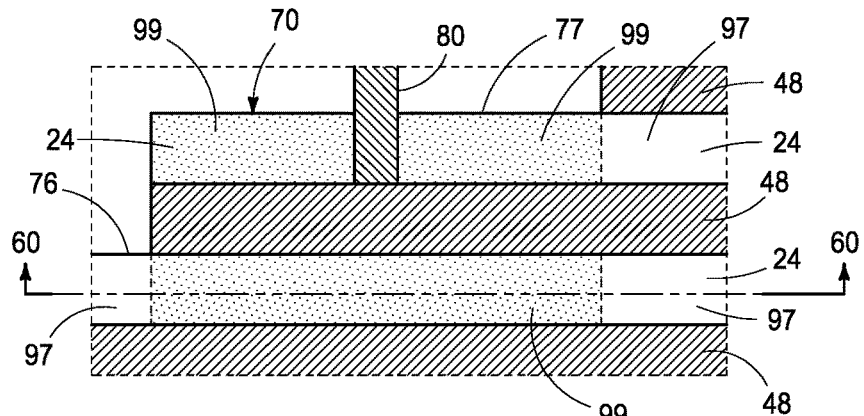

The ion implanting referred to above will likely implant the implant species into at least insulative material (e.g., 24) that in the finished-circuitry construction is immediately-directly-below conducting material 48 that is in the respective individual tread, albeit most-likely to a lower molar density than molar density of the species in what was the implanted region directly-there-above (now gone in the example embodiment). Accordingly, and in one embodiment regardless, the insulative material (e.g., 24) that is immediately-directly-below the conducting material (e.g., 48) that is in the respective individual treads 77 in the finished-circuitry construction is of different composition from the insulative material that is horizontally to at least one side of at least some of the respective individual treads. In one such embodiment, the different composition of the insulative material that is immediately-directly-below the conducting material that is in the respective individual treads in the finished-circuitry construction relative to the different composition of the insulative material that is horizontally to at least one side of the at least some of the respective individual treads is characterized by greater molar density of the species in the insulative material that is immediately-directly-below the conducting material that is in the respective individual treads in the finished-circuitry construction compared to molar density of the species, if any, in the insulative material that is horizontally to at least one side of the at least some of the respective individual treads. Such is exemplified in FIGS. 58-60 by a stippled region 99 of material 24 in tread 77 below conducting material 48 as compared to non-stippled material 24 laterally-there-adjacent (e.g., identified as a region 97). Where individual stairs 70 have a second tier 20 directly above a first tier 22 as shown (not required and such may be reversed as stated above), a region 99 may also be in insulative material 24 that is directly above conducting material 48, as shown, and which may be at a higher molar density that that which is immediately-directly-below the conducting material.

Any other attribute(s) or aspect(s) as shown and/or described herein with respect to other embodiments may be used in the embodiments shown and described with reference to the above embodiments.

Alternate embodiment constructions may result from method embodiments described above, or otherwise. Regardless, embodiments of the invention encompass memory arrays independent of method of manufacture. Nevertheless, such memory arrays may have any of the attributes as described herein in method embodiments. Likewise, the above-described method embodiments may incorporate, form, and/or have any of the attributes described with respect to device embodiments.

In one embodiment, memory circuitry comprising strings (e.g., 49) of memory cells (e.g., 56) comprises two memory-array regions (e.g., 12) having a stair-step region (e.g., 13) there-between. Memory blocks (e.g., 58) are in each of the two memory-array regions and individually comprise a vertical stack (e.g., 18) comprising alternating insulative tiers (e.g., 20) and conductive tiers (e.g., 22). Channel-material strings (e.g., 53) of memory cells (e.g., 56) extend through the insulative tiers and the conductive tiers in the memory blocks in the two memory-array regions. Walls (e.g., 57) are individually between immediately-adjacent of the memory blocks. The walls extend in a first direction (e.g., 55) from one of the two memory-array regions into the other of the two memory-array regions across the stair-step region. The insulative tiers and the conductive tiers extend along the first direction from the two memory-array regions into the stair-step region. The conductive tiers individually comprise a conductive line (e.g., 29) that extends across the stair-step region along the first direction into and within individual of the memory blocks in each of the two memory-array regions. Stair-step structures (e.g., 66) are along the first direction within the stair-step region laterally between immediately-adjacent of the walls. The stair-step structures comprise a flight (e.g., 67 or 69) of stairs (e.g., 70) in a first vertical cross-section (e.g., that of FIG. 54) along the first direction. Multiple different-depth treads (e.g., 76 and 77) are in the individual stairs in a second vertical cross-section (e.g., that of FIG. 55 or 56) that is along a second direction (e.g., 75) that is orthogonal to the first direction. Individual of the multiple different-depth treads comprise conducting material (e.g., 48) of one of the conductive tiers. Conductive vias (e.g., 80) are individually directly above and directly against the conducting material that is in the respective individual treads and directly electrically coupled with the conductive line in the one conductive tier. Individual of the insulative tiers are immediately-directly-below the conducting material that is in the respective individual treads and comprise insulative material (e.g., 24). The insulative material that is immediately-directly-below the conducting material that is in the respective individual treads (e.g., in region 99) is of different composition from the insulative material that is horizontally to at least one side of the at least some of the respective individual treads (e.g., in region 97).

In one embodiment, the different composition of the insulative material that is immediately-directly-below the conducting material that is in the respective individual treads relative to the different composition of the insulative material that is horizontally to at least one side of the at least some of the respective individual treads is at least partially characterized by greater molar density of an element in the insulative material that is immediately-directly-below the conducting material that is in the respective individual treads compared to molar density of the element, if any, in the insulative material that is horizontally to at least one side of the at least some of the respective individual treads. In one such embodiment, the element is at least one from IUPAC Groups 13, 14, 15, 16, 17, and 18 of the periodic table, in one such embodiment only one from IUPAC Groups 13, 14, 15, 16, 17, and 18 of the periodic table and in another embodiment the element is more than one from IUPAC Groups 13, 14, 15, 16, 17, and 18 of the periodic table. In one embodiment, the at least one element is at least one of carbon, boron, or nitrogen. In one embodiment, the at least one element is at least one of antimony, germanium, or argon. In one embodiment, the greater molar density is no greater than $1 \times 10^{21}$ atoms/cm$^3$ and in one embodiment the greater molar density is no less than $1 \times 10^{14}$ atoms/cm$^3$.

Any other attribute(s) or aspect(s) as shown and/or described herein with respect to other embodiments may be used.

In one embodiment, memory circuitry comprising strings (e.g., 49) of memory cells (e.g., 56) comprises memory blocks (e.g., 49) individually comprising a stack (e.g., 18) comprising vertically-alternating insulative tiers (e.g., 20) and conductive tiers (e.g., 22). Channel-material strings (e.g., 53) of memory cells (e.g., 56) extend through the insulative tiers and the conductive tiers in a memory-array region (e.g., 12; e.g., regardless of whether one or more than one). The insulative tiers and the conductive tiers of the memory blocks extend from the memory-array region into a stair-step region (e.g., 13). The stair-step region comprises a flight (e.g., 67 or 69) of stairs (e.g., 70) in a first vertical cross-section (e.g., that of FIG. 54) along a first direction (e.g., 55). Multiple different-depth treads (e.g., 76 and 77) are in the individual stairs in a second vertical cross-section (e.g., that of FIG. 55 or 56) that is along a second direction (e.g., 75) that is orthogonal to the first direction. Individual of the multiple different-depth treads comprise conducting material (e.g., 48) of one of the conductive tiers. Conductive vias (e.g., 80) are individually directly above and directly against the conducting material that is in the respective individual treads. Individual of the insulative tiers are immediately-directly-below the conducting material that is in the respective individual treads and comprise insulative material (e.g., 24). The insulative material that is immediately-directly-below the conducting material that is in the respective individual treads (e.g., in region 99) is of different composition from the insulative material that is horizontally to at least one side of at least some of the respective individual treads (e.g., in region 97). In one embodiment, the first direction is along a longitudinal horizontally-elongated orientation (e.g., along direction 55) of individual of the memory blocks. Any other attribute(s) or aspect(s) as shown and/or described herein with respect to other embodiments may be used.

The above processing(s) or construction(s) may be considered as being relative to an array of components formed as or within a single stack or single deck of such components above or as part of an underlying base substrate (albeit, the single stack/deck may have multiple tiers). Control and/or other peripheral circuitry for operating or accessing such components within an array may also be formed anywhere as part of the finished construction, and in some embodiments may be under the array (e.g., CMOS under-array). Regardless, one or more additional such stack(s)/deck(s) may be provided or fabricated above and/or below that shown in the figures or described above. Further, the array(s) of components may be the same or different relative one another in different stacks/decks and different stacks/decks may be of the same thickness or of different thicknesses relative one another. Intervening structure may be provided between immediately-vertically-adjacent stacks/decks (e.g., additional circuitry and/or dielectric layers). Also, different stacks/decks may be electrically coupled relative one another. The multiple stacks/decks may be fabricated separately and sequentially (e.g., one atop another), or two or more stacks/decks may be fabricated at essentially the same time.

The assemblies and structures discussed above may be used in integrated circuits/circuitry and may be incorporated into electronic systems. Such electronic systems may be used in, for example, memory modules, device drivers, power modules, communication modems, processor modules, and application-specific modules, and may include multilayer, multichip modules. The electronic systems may be any of a broad range of systems, such as, for example, cameras, wireless devices, displays, chip sets, set top boxes, games, lighting, vehicles, clocks, televisions, cell phones, personal computers, automobiles, industrial control systems, aircraft, etc.

In this document unless otherwise indicated, "elevational", "higher", "upper", "lower", "top", "atop", "bottom", "above", "below", "under", "beneath", "up", and "down" are generally with reference to the vertical direction. "Horizontal" refers to a general direction (i.e., within 10 degrees) along a primary substrate surface and may be relative to which the substrate is processed during fabrication, and vertical is a direction generally orthogonal thereto. Reference to "exactly horizontal" is the direction along the primary substrate surface (i.e., no degrees there-from) and may be relative to which the substrate is processed during fabrication. Further, "vertical" and "horizontal" as used herein are generally perpendicular directions relative one another and independent of orientation of the substrate in three-dimensional space. Additionally, "elevationally-extending" and "extend(ing) elevationally" refer to a direction that is angled away by at least 45° from exactly horizontal. Further, "extend(ing) elevationally", "elevationally-extending", "extend(ing) horizontally", "horizontally-extending" and the like with respect to a field effect transistor are with reference to orientation of the transistor's channel length along which current flows in operation between the source/drain regions. For bipolar junction transistors, "extend(ing) elevationally" "elevationally-extending", "extend(ing) horizontally", "horizontally-extending" and the like, are with reference to orientation of the base length along which current flows in operation between the emitter and collector.

In some embodiments, any component, feature, and/or region that extends elevationally extends vertically or within 10° of vertical.

Further, "directly above", "directly below", and "directly under" require at least some lateral overlap (i.e., horizontally) of two stated regions/materials/components relative one another. Also, use of "above" not preceded by "directly" only requires that some portion of the stated region/material/component that is above the other be elevationally outward of the other (i.e., independent of whether there is any lateral overlap of the two stated regions/materials/components). Analogously, use of "below" and "under" not preceded by "directly" only requires that some portion of the stated region/material/component that is below/under the other be elevationally inward of the other (i.e., independent of whether there is any lateral overlap of the two stated regions/materials/components).

Any of the materials, regions, and structures described herein may be homogenous or non-homogenous, and regardless may be continuous or discontinuous over any material which such overlie. Where one or more example composition(s) is/are provided for any material, that material may comprise, consist essentially of, or consist of such one or more composition(s). Further, unless otherwise stated, each material may be formed using any suitable existing or future-developed technique, with atomic layer deposition, chemical vapor deposition, physical vapor deposition, epitaxial growth, diffusion doping, and ion implanting being examples.

Additionally, "thickness" by itself (no preceding directional adjective) is defined as the mean straight-line distance through a given material or region perpendicularly from a closest surface of an immediately-adjacent material of different composition or of an immediately-adjacent region. Additionally, the various materials or regions described herein may be of substantially constant thickness or of variable thicknesses. If of variable thickness, thickness refers to average thickness unless otherwise indicated, and such material or region will have some minimum thickness and some maximum thickness due to the thickness being variable. As used herein, "different composition" only requires those portions of two stated materials or regions that may be directly against one another to be chemically and/or physically different, for example if such materials or regions are not homogenous. If the two stated materials or regions are not directly against one another, "different composition" only requires that those portions of the two stated materials or regions that are closest to one another be chemically and/or physically different if such materials or regions are not homogenous. In this document, a material, region, or structure is "directly against" another when there is at least some physical touching contact of the stated materials, regions, or structures relative one another. In contrast, "over", "on", "adjacent", "along", and "against" not preceded by "directly" encompass "directly against" as well as construction where intervening material(s), region(s), or structure(s) result(s) in no physical touching contact of the stated materials, regions, or structures relative one another.

Herein, regions-materials-components are "electrically coupled" relative one another if in normal operation electric current is capable of continuously flowing from one to the other and does so predominately by movement of subatomic positive and/or negative charges when such are sufficiently generated. Another electronic component may be between and electrically coupled to the regions-materials-components. In contrast, when regions-materials-components are referred to as being "directly electrically coupled", no intervening electronic component (e.g., no diode, transistor, resistor, transducer, switch, fuse, etc.) is between the directly electrically coupled regions-materials-components.

Any use of "row" and "column" in this document is for convenience in distinguishing one series or orientation of features from another series or orientation of features and along which components have been or may be formed. "Row" and "column" are used synonymously with respect to any series of regions, components, and/or features independent of function. Regardless, the rows may be straight and/or curved and/or parallel and/or not parallel relative one another, as may be the columns. Further, the rows and columns may intersect relative one another at 90° or at one or more other angles (i.e., other than the straight angle).

The composition of any of the conductive/conductor/conducting materials herein may be conductive metal material and/or conductively-doped semiconductive/semiconductor/semiconducting material. "Metal material" is any one or combination of an elemental metal, any mixture or alloy of two or more elemental metals, and any one or more metallic compound(s).

Herein, any use of "selective" as to etch, etching, removing, removal, depositing, forming, and/or formation is such an act of one stated material relative to another stated material(s) so acted upon at a rate of at least 2:1 by volume. Further, any use of selectively depositing, selectively growing, or selectively forming is depositing, growing, or forming one material relative to another stated material or materials at a rate of at least 2:1 by volume for at least the first 75 Angstroms of depositing, growing, or forming.

Unless otherwise indicated, use of "or" herein encompasses either and both.

CONCLUSION

In some embodiments, a method used in forming memory circuitry comprises forming a stack comprising vertically-alternating first tiers and second tiers, with the stack extending from a memory-array region into a stair-step region. The stair-step region comprises a flight of stairs in a first vertical cross-section along a first direction. Masking material is formed directly above the flight of stairs. A species is ion implanted into the masking material to form different-composition first and second regions that are directly above individual of the stairs along a second direction that is orthogonal to the first direction. One of the first and the second regions is removed selectively relative to the other of the first and the second regions. After the removing, the other of the first and second regions is used as a mask while etching through one of the first tiers and one of the second tiers in the individual stairs to form multiple different-depth treads in the individual stairs in a second vertical cross-section along the second direction.

In some embodiments, a method used in forming memory circuitry, comprises forming a stack comprising vertically-alternating first tiers and second tiers, with the stack extending from a memory-array region into a stair-step region. The stair-step region comprises a flight of stairs in a first vertical cross-section along a first direction. Masking material comprising polysilicon or silicon nitride is formed directly above the flight of stairs. A species is ion implanted into the masking material to form different-composition first and second regions that are directly above individual of the stairs along a second direction that is orthogonal to the first direction. The ion implanting is into the first region. The ion-implanted species is at least one element from IUPAC Groups 13, 14, 15, 16, 17, and 18 of the periodic table. The ion-implanted species is present in the first region of the masking material at $1\times10^{16}$ to $1\times10^{22}$ atoms/cm$^3$. One of the first and the second regions is removed selectively relative to the other of the first and the second regions. After the removing of the one, the other of the first and the second regions is used as a mask while etching through one of the first tiers and one of the second tiers in the individual stairs to form multiple different-depth treads in the individual stairs in a second vertical cross-section along the second direction. All remaining of the other of the first and the second regions of the masking material are removed after the using.

In some embodiments, memory circuitry comprising strings of memory cells comprises a stack comprising vertically-alternating insulative tiers and conductive tiers. Channel-material strings of memory cells extend through the insulative tiers and the conductive tiers in a memory-array region. The insulative tiers and the conductive tiers extend from the memory-array region into a stair-step region. The stair-step region comprises a flight of stairs in a first vertical cross-section along a first direction. Multiple different-depth treads are in the individual stairs in a second vertical cross-section that is along a second direction that is orthogonal to the first direction. Individual of the multiple different-depth treads comprise conducting material of one of the conductive tiers. Conductive vias are individually directly above and directly against the conducting material that is in the respective individual treads. Individual of the insulative tiers are immediately-directly-below the conducting material that is in the respective individual treads and comprise insulative material. The insulative material that is immediately-directly-below the conducting material that is in the respective individual treads is of different composition from the insulative material that is horizontally to at least one side of at least some of the respective individual treads.

In some embodiments, memory circuitry comprising strings of memory cells comprises two memory-array regions having a stair-step region there-between. Memory blocks are in each of the two memory-array regions that individually comprise a vertical stack comprising alternating insulative tiers and conductive tiers. Channel-material strings of memory cells extend through the insulative tiers and the conductive tiers in the memory blocks in the two memory-array regions. Walls are individually between immediately-adjacent of the memory blocks. The walls extend in a first direction from one of the two memory-array regions into the other of the two memory-array regions across the stair-step region. The insulative tiers and the conductive tiers extend along the first direction from the two memory-array regions into the stair-step region. The conductive tiers individually comprise a conductive line that extends across the stair-step region along the first direction into and within individual of the memory blocks in each of the two memory-array regions. Stair-step structures along the first direction within the stair-step region are laterally between immediately-adjacent of the walls. The stair-step structures comprise a flight of stairs in a first vertical cross-section along the first direction. Multiple different-depth treads are in the individual stairs in a second vertical cross-section that is along a second direction that is orthogonal to the first direction. Individual of the multiple different-depth treads comprise conducting material of one of the conductive tiers. Conductive vias are individually directly above and directly against the conducting material that is in the respective individual treads and are directly electrically coupled with the conductive line in the one conductive tier. Individual of the insulative tiers are immediately-directly-below the conducting material that is in the respective individual treads and comprise insulative material. The insulative material that is immediately-directly-below the conducting material that is in the respective individual treads is of different composition from the insulative material that is horizontally to at least one side of at least some of the respective individual treads.

In compliance with the statute, the subject matter disclosed herein has been described in language more or less specific as to structural and methodical features. It is to be understood, however, that the claims are not limited to the specific features shown and described, since the means herein disclosed comprise example embodiments. The claims are thus to be afforded full scope as literally worded, and to be appropriately interpreted in accordance with the doctrine of equivalents.

The invention claimed is:

1. A method used in forming memory circuitry, comprising:
   forming a stack comprising vertically-alternating first tiers and second tiers, the stack extending from a memory-array region into a stair-step region, the stair-step region comprising a flight of stairs in a first vertical cross-section along a first direction;
   forming masking material directly above the flight of stairs;
   ion implanting a species into the masking material to form different-composition first and second regions that are directly above individual of the stairs along a second direction that is orthogonal to the first direction;
   removing one of the first and the second regions selectively relative to the other of the first and the second regions; and
   after the removing, using the other of the first and the second regions as a mask while etching through one of the first tiers and one of the second tiers in the individual stairs to form multiple different-depth treads in the individual stairs in a second vertical cross-section along the second direction.

2. The method of claim 1 wherein the ion-implanted species is at least one element from IUPAC Groups 13, 14, 15, 16, 17, and 18 of the periodic table.

3. The method of claim 2 wherein the ion implanting is into the first region and the ion-implanted species is present in the first region of the masking material at $1\times10^{16}$ to $1\times10^{22}$ atoms/cm$^3$.

4. The method of claim 3 wherein the ion-implanted species is present in the first region of the masking material at $1\times10^{18}$ to $5\times10^{21}$ atoms/cm$^3$.

5. The method of claim 2 wherein the ion-implanted species is only one element from IUPAC Groups 13, 14, 15, 16, 17, and 18 of the periodic table.

6. The method of claim 2 wherein the ion-implanted species is more than one element from IUPAC Groups 13, 14, 15, 16, 17, and 18 of the periodic table.

7. The method of claim 1 wherein the ion implanting is into the first region, the removing is of the second region, the mask comprises the first region, and a deeper of the multiple treads is in a horizontal location relative to the first and second directions of the second region.

8. The method of claim 7 wherein the ion-implanted species is at least one element from IUPAC Groups 13, 14, 15, 16, 17, and 18 of the periodic table.

9. The method of claim 8 wherein the at least one element is at least one of carbon, boron, or nitrogen.

10. The method of claim 8 wherein the at least one element is not any of antimony, germanium, or argon.

11. The method of claim 1 wherein the ion implanting is into the first region, the removing is of the first region, the mask comprises the second region, and a deeper of the multiple treads is in a horizontal location relative to the first and second directions of the first region.

12. The method of claim 11 wherein the ion-implanted species is at least one element from IUPAC Groups 13, 14, 15, 16, 17, and 18 of the periodic table.

13. The method of claim 12 wherein the at least one element is at least one of antimony, germanium, or argon.

14. The method of claim 1 further comprising removing all remaining of the other of the first and the second regions of the masking material after the using.

15. The method of claim 1 wherein some of the other of the first and the second regions of the masking material remains in a finished-circuitry construction.

16. The method of claim 1 wherein the first tiers are conductive and the second tiers are insulative at least in a finished-circuitry construction, individual of the multiple different-depth treads comprising conducting material of one of the conductive tiers in the finished-circuitry construction; and further comprising:
forming conductive vias that are individually directly above and directly against the conducting material that is in the respective individual treads in the finished-circuitry construction; and
individual of the insulative tiers being immediately-directly-below the conducting material that is in the respective individual treads in the finished-circuitry construction and comprising insulative material, the insulative material that is immediately-directly-below the conducting material that is in at least some of the respective individual treads in the finished-circuitry construction being of different composition from the insulative material that is horizontally to at least one side of the at least some of the respective individual treads.

17. The method of claim 16 wherein,
the ion implanting is into the first region; and
the ion implanting implants the species into the insulative material that is immediately-directly-below the conducting material that is in the respective individual treads in the finished-circuitry construction to a lower molar density than molar density of the species in the first region, the different composition of the insulative material that is immediately-directly-below the conducting material that is in the respective individual treads in the finished-circuitry construction relative to the different composition of the insulative material that is horizontally to the at least one side of the at least some of the respective individual treads being characterized by greater molar density of the species in the insulative material that is immediately-directly-below the conducting material that is in the respective individual treads in the finished-circuitry construction compared to molar density of the species, if any, in the insulative material that is horizontally to the at least one side of the at least some of the respective individual treads.

18. The method of claim 1 wherein the multiple different-depth treads in the individual stairs are only two in number.

19. A method used in forming memory circuitry, comprising:
forming a stack comprising vertically-alternating first tiers and second tiers, the stack extending from a memory-array region into a stair-step region, the stair-step region comprising a flight of stairs in a first vertical cross-section along a first direction;
forming masking material comprising polysilicon or silicon nitride directly above the flight of stairs;
ion implanting a species into the masking material to form different-composition first and second regions that are directly above individual of the stairs along a second direction that is orthogonal to the first direction; the ion implanting being into the first region, the ion-implanted species is at least one element from IUPAC Groups 13, 14, 15, 16, 17, and 18 of the periodic table, and the ion-implanted species is present in the first region of the masking material at $1\times10^{16}$ to $1\times10^{22}$ atoms/cm$^3$;
removing one of the first and the second regions selectively relative to the other of the first and the second regions;
after the removing of the one, using the other of the first and the second regions as a mask while etching through one of the first tiers and one of the second tiers in the individual stairs to form multiple different-depth treads in the individual stairs in a second vertical cross-section along the second direction; and
removing all remaining of the other of the first and the second regions of the masking material after the using.

20. The method of claim 19 wherein,
the at least one element is at least one of carbon, boron, or nitrogen; and
the removing is of the second region, the mask comprises the first region, and a deeper of the multiple treads is in a horizontal location relative to the first and second directions of the second region.

* * * * *